(12) United States Patent
Janecek et al.

(10) Patent No.: US 8,705,384 B2
(45) Date of Patent: Apr. 22, 2014

(54) REMOTE CONTROL OF TRANSMITTER-SIDE RATE ADAPTATION

(75) Inventors: John Martin Janecek, El Dorado Hills, CA (US); Daniel Robert Dillon, Fair Oaks, CA (US)

(73) Assignee: DSP Group Inc., Santa Clara, CA (US)

( * ) Notice: Subject to any disclaimer, the term of this patent is extended or adjusted under 35 U.S.C. 154(b) by 605 days.

(21) Appl. No.: 12/783,264

(22) Filed: May 19, 2010

(65) Prior Publication Data

US 2011/0286340 A1 Nov. 24, 2011

(51) Int. Cl.
*H04J 1/16* (2006.01)
*H04W 4/00* (2009.01)
*H04L 1/18* (2006.01)

(52) U.S. Cl.
USPC ............ 370/252; 370/329; 370/338; 714/749

(58) Field of Classification Search
None
See application file for complete search history.

(56) References Cited

U.S. PATENT DOCUMENTS

| | | | |
|---|---|---|---|
| 2002/0149518 A1* | 10/2002 | Haataja et al. ................. | 342/458 |
| 2008/0288845 A1* | 11/2008 | Tsfati et al. ................... | 714/748 |
| 2009/0040990 A1* | 2/2009 | Xhafa et al. ................... | 370/338 |
| 2009/0150738 A1* | 6/2009 | Nishio et al. ................... | 714/749 |
| 2010/0008342 A1* | 1/2010 | Nishida et al. ................. | 370/338 |
| 2010/0135289 A1* | 6/2010 | Bowes ........................... | 370/389 |

FOREIGN PATENT DOCUMENTS

EP 1 802 021 A1 6/2007

OTHER PUBLICATIONS

International Search Report and Written Opinion of the International Searching Authority for corresponding PCT Application No. PCT/US2011/036660, mailed Nov. 15, 2011 (16 pgs.).

IEEE Computer Society, "IEEE Std 802.11TM™, Information Technology—Telecommunications and information exchange between systems—Local and metropolitan area networks—Specific Requirements, Part 11: Wireless LAN Medium Access Control (MAC) and Physical Layer (PHY) Specifications", Jun. 12, 2007, 1232 pages.
International Telecommunication Union, "Data Networks and Open System Interconnection—Model and Notation, ITU-T Recommendation X.200", Jul. 1994, 63 pages.
Michael Loiacono et al., "The Snowball Effect: Detailing Performance Anomalies of 802.11 Rate Adaptation", Nov. 2007, 6 pages, IEEE GLOBECOM 2007 proceedings.
Invitation to Pay Additional Fees and, Where Applicable, Protest Fee and Annex to Form PCT/ISA/206 Communication Relating to the Results of the Partial International Search from counterpart application No. PCT/US2011/036660, mailed Aug. 29, 2011, (7 pages).

* cited by examiner

*Primary Examiner* — Yemane Mesfin
*Assistant Examiner* — Peter Chen
(74) *Attorney, Agent, or Firm* — Oren Reches

(57) ABSTRACT

In general, this disclosure is directed to techniques for remotely controlling a transmitter-side rate adaptation algorithm. According to one aspect, a method includes detecting, with a receiver device, that a packet received from a transmitter is corrupted. The method further includes sending, with the receiver device, a positive acknowledgement for the packet to the transmitter in response to at least detecting that the packet is corrupted. According to another aspect, a method includes determining, with a receiver device, a targeted outcome for a rate adaptation algorithm performed by a transmitter. The method further includes using, with the receiver device, positive acknowledgements to remotely control the rate adaptation algorithm performed by the transmitter based on at least the targeted outcome.

24 Claims, 20 Drawing Sheets

REMOTE CONTROL OF TRANSMITTER-SIDE RATE ADAPTATION

TECHNICAL FIELD

The disclosure relates to techniques for controlling rate adaptation in wireless communication devices.

BACKGROUND

Wireless local area network (WLAN) stations, such as radio network cards and access points, typically provide access to a plurality of different physical layer data transmission rates (i.e., PHY rates). For example, WLAN stations designed in accordance with one of the 802.11x standard protocols may have physical layer data transmission rates at 1, 2, 6, 9, 12, 18, 24, 36, 48, and 54 megabits per second (Mbps). When such a station attempts to transmit a data frame or packet, it must decide which PHY rate to use. In general, higher PHY rates allow for higher throughput but at a reduced range while lower PHY rates allow for lower throughput at a greater range.

Some WLAN stations may implement a rate fallback algorithm for determining which PHY rate to use in a given circumstance. Typically, a rate fallback algorithm is implemented such that when the percentage of unsuccessful frame exchange sequences reaches an upper threshold, the transmitting station decides to decrease the PHY rate. Likewise, when the percentage of successful frame exchange sequences reaches a lower threshold, the transmitting station decides to increase the PHY rate. Because the distance between transmitting and receiving devices may vary within a wireless network, such a rate fallback algorithm allows the transmitter device to adapt the PHY rate to maximize throughput while maintaining an adequate wireless range.

SUMMARY

In general, this disclosure is directed to techniques for remotely controlling a transmitter-side rate adaptation algorithm. A receiver may have access to information regarding potential causes of packet corruption during a frame exchange sequence. For example, the receiver may have access to information regarding channel interference, link quality, and/or frame transmission history. The receiver may use this information to remotely control or manipulate the transmitter-side rate adaptation algorithm. In some examples, the receiver may send positive acknowledgment frames in response to receiving corrupted frames in order to control the transmitter-side rate adaptation algorithm. The techniques in this disclosure may be used, in some examples, to prevent a catastrophic failure of the wireless communication link and/or to improve throughput of the wireless communication link.

According to one aspect, this disclosure is directed to a method that includes detecting, with a receiver device, that a packet received from a transmitter is corrupted. The method further includes sending, with the receiver device, a positive acknowledgement for the packet to the transmitter in response to at least detecting that the packet is corrupted.

According to another aspect, this disclosure is directed a method that includes determining, with a receiver device, a targeted outcome for a rate adaptation algorithm performed by a transmitter. The method further includes using, with the receiver device, positive acknowledgements to remotely control the rate adaptation algorithm performed by the transmitter based on at least the targeted outcome.

According to another aspect, this disclosure is directed to a receiver device that includes an error detection module configured to detect that a packet received at the receiver device from a transmitter is corrupted. The receiver device further includes a transmission sequence manager configured to send a positive acknowledgement for the packet to the transmitter in response to at least the error detection module detecting that the packet is corrupted.

According to another aspect, this disclosure is directed to a receiver device that includes a remote rate control module configured to determine a targeted outcome for a rate adaptation algorithm performed by a transmitter. The receiver device further includes a transmission sequence manager configured to use positive acknowledgements to remotely control the rate adaptation algorithm performed by the transmitter based on at least the targeted outcome.

These and various other features and advantages will be apparent from a reading of the following detailed description.

DETAILED DESCRIPTION

Figure 1A:
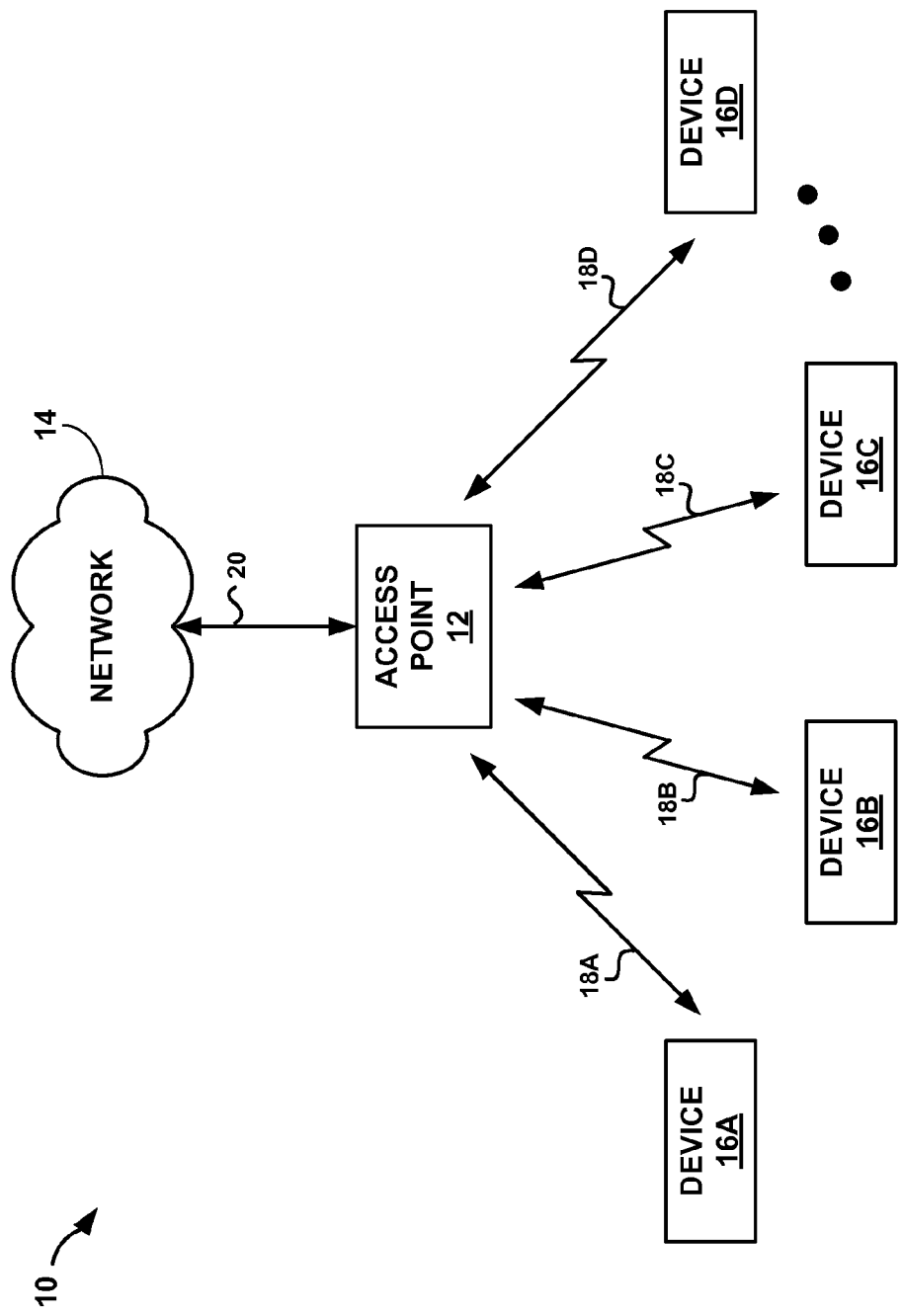
FIG. 1A is a block diagram illustrating an example wireless communication network according to this disclosure.

In general, this disclosure is directed to techniques for remotely controlling a transmitter-side rate adaptation algorithm. The transmitter-side rate adaptation algorithm may determine which physical layer data transmission rate (i.e., PHY rate) to use for a particular frame exchange sequence. In some examples, the rate adaptation algorithm may reduce the physical layer transmission rate after detecting a particular number or percentage of unsuccessfully transmitted frames. Such a rate adaptation algorithm may rely on the principle that a reduction in physical layer transmission rate will increase the likelihood of a successful frame exchange sequence.

A receiver may have access to information regarding potential causes of frame corruption during a frame exchange sequence. For example, the receiver may have access to information indicating that a reduction in physical layer transmission rate will not increase, or possibly even decrease, the likelihood of a successful frame exchange sequence. For example, the receiver may have access to information regarding channel interference, the link quality, and/or the frame transmission history. In some examples, some or all of this information may not necessarily be available to the transmitter.

The receiver may use this information to remotely control or manipulate the transmitter-side rate adaptation algorithm. For example, if the receiver has information that a reduction in physical layer transmission rate will decrease the likelihood of a successful frame transmission sequence, the receiver may take one or more actions to prevent the rate adaptation algorithm from decreasing the transmission rate. In some examples, the receiver may cause the transmitter to detect, as successfully transmitted, a frame which was actually unsuccessfully transmitted. For example, the receiver may send a positive acknowledgment frame in response to receiving a corrupted frame in order to control the transmitter-side rate adaptation. Upon detecting the frame as successfully transmitted, the transmitter-side rate adaptation algorithm may determine not to decrease the physical layer transmission rate. In this manner, the receiver may prevent a transmitter-side rate adaptation algorithm from decreasing the likelihood of a successful frame exchange sequence.

In some examples, the techniques in this disclosure may be used to prevent the catastrophic failure of a communications link. A catastrophic failure, as used herein, may refer to a condition where the physical layer transmission rate is low enough that channel interference causes substantially all of the frames to be unsuccessfully transmitted between a transmitter and receiver.

For example, consider a case where the source of interference is generated by a Digital Enhanced Cordless Telecommunication (DECT) transmitter collocated on the receiving station. The interference may include periodic bursts of interference with a period of approximately 10 milliseconds (ms). If the rate fallback algorithm operating on the transmitting station uses 1 Mbps PHY rate and the packet length is 1500 bytes (e.g., a typical maximum length packet used in a file transfer), then the duration of the packet may be larger than the burst period of 10 ms, guaranteeing that the packet will fail. Once the fallback algorithm has reached this point, the transmitting station can now no longer successfully transmit these maximum length frames to the receiver.

According to this disclosure, the receiver may, in some examples, have access to information regarding the channel interference. Based on this information, the receiver may determine that a further reduction in transmission rate will result in a catastrophic failure for the communications system, and take action to prevent the transmitter-side rate adaptation algorithm from reducing the transmission rate. By using receiver-side knowledge of the channel interference to remotely control a transmitter-side rate adaptation algorithm, the receiver may be able to prevent a catastrophic failure from occurring during a wireless communications session.

In additional examples, the techniques in this disclosure may be used to improve the throughput of a communications link that uses a transmitter-side rate adaptation algorithm. For conventional links that use a transmitter-side rate adaptation algorithm, channel interference may cause a certain percentage of frame exchange sequences to be unsuccessful. If the percentage is high enough, the transmitter-side rate adaptation algorithm may reduce the physical layer transmission rate. As the physical layer transmission rate decreases, the packet transmission time increases, which may cause a decrease in the throughput of the communications link. Moreover, as the packet transmission time increases, the probability of a packet hitting a burst of interference and becoming corrupt may also increase. If corrupted packets are retransmitted in the communications system, an increase in the number of corrupted packets will cause the number of retransmitted packets to increase, which may cause an additional reduction in the throughput of the communications link. In addition, during packet retransmissions, the amount of time taken up by a transmitter-side backoff algorithm may also increase, thereby causing an additional reduction in the throughput of the communications link.

The techniques in this disclosure, however, may be designed to reduce and/or prevent a transmitter-side rate adaptation algorithm from reducing the physical layer transmission rate due to channel interference. This in turn may result in a lower packet transmission time as compared to that which was obtainable in conventional systems operating in the presence of channel interference. The lower packet transmission time may cause an increase in system throughput. Moreover, the lower packet transmission times may decrease the number of retries needed to successfully transmit a frame. Decreasing the number of retry frames that are transmitted may also cause the system throughput to increase. In addition, because the number of retry frames is reduced, the amount of time needed to perform the transmitter-side backoff algorithm may also be reduced. In this manner, the remote rate control techniques may provide, in some examples, a three-fold increase in system throughput (i.e., an increase in up to three different aspects) compared to that which is obtainable in conventional systems.

In some examples, the receiver device may modify the use of existing control elements within a known standard communications protocol to remotely control the transmitter-side rate adaptation algorithm. For example, the receiver may modify the use of the positive acknowledgement frames within an existing communication standard (e.g., an IEEE 802.11 standard ACK frame) to control the transmitter-side rate adaptation algorithm. More specifically, the receiver may modify the use of the positive acknowledgement frames such that positive acknowledgment frames are sent to the transmitter in response to receiving corrupted data frames. In this manner, the remote rate control techniques in this disclosure may operate in conjunction with existing wireless link layer communication protocols, such as the IEEE 802.11 standard protocols for example, without necessarily requiring the use of new data fields or new types of control frames for the communications protocol.

In additional examples, the transmitter may not need to be aware that the receiver device is performing the remote rate control techniques of this disclosure. For example, the receiver may use one or more existing elements of a communications protocol in a manner different from that which was originally intended by the communications protocol in order to remotely control a transmitter-side rate adaptation algorithm. However, the transmitter device may use these elements according to the originally intended use as defined by the communications protocol. Thus, transmitter devices within a wireless network do not necessarily need to be updated or modified to implement the remote rate control techniques described in this disclosure.

In further examples, the receiver device may be an access point station (e.g., an IEEE 802.11 access point station) for a number of different non-access point client stations associated with the wireless network. The wireless network may, in some examples, be an open wireless network that allows for the association of a plurality of non-access point stations some of which may not be known to the access point station in advance. Because the non-access point stations in a wireless network do not necessarily need to be modified in order to implement the rate control techniques described herein, such techniques may be easily integrated into key access point devices within a wireless network without the need to update the communications interface for client devices that may connect to the network.

The remote rate control techniques of this disclosure, in some examples, may involve the sending of positive acknowledgments to a transmitter in response to packets that were not successfully received. Because the transmitter detects that the packet was successfully received, the packet may be dropped from the transmission queue without ever being successfully transmitted to the receiver device. In such cases, a missing or corrupted packet may be detected and handled by a layer that is above the MAC layer (e.g., the transport layer). For example, the transport layer may perform error correction to recover the corrupted data or request retransmission of the packet that was corrupted in the link layer. As another example, an upper layer (e.g., the application layer) may determine that a certain number of corrupted packets may be tolerated within the data stream without reducing the quality of the overall data stream to unacceptable levels. In such examples, the corrupted packet may not be retransmitted by the upper layers. In any case, the techniques in this disclosure allow for the "off-loading" of corrupted packets to communications layers above the layer in which the techniques of this disclosure are implemented in order to avoid catastrophic failures and/or drops in throughput that may be caused by a transmitter-side rate adaptation algorithm.

The terms "packet" and "frame" are used interchangeably in this disclosure, and may refer herein to a message, a unit of data, and/or a unit of control information that is passed between a transmitter and receiver device. In some examples, a "packet" or "frame" may refer to a data frame or ACK frame formatted in accordance with the IEEE 802.11 standard communications protocol.

The techniques in this disclosure may involve the transmission of a positive ACK frame in response to receiving a corrupted data frame. Such an ACK frame may be referred to herein as a "forced ACK frame." In contrast, a "standard ACK frame" may refer to an ACK frame that is sent in response to a received data frame that is not corrupt.

Although the examples in this disclosure are generally described with respect to wireless communication networks, the techniques of this disclosure may be implemented as part of any wired or wireless communication network. Moreover, the examples in this disclosure generally describe the remote rate control techniques of this disclosure as being implemented in the media access control (MAC) layer. However, the techniques may also be implemented as part of any communications layer or as part of multiple layers within the Open System Interconnection (OSI) Seven Layer Model or as part of any other communications model without departing from the scope of this disclosure.

FIG. 1A is a block diagram illustrating an example wireless communication network 10 according to this disclosure. Wireless communication network 10 may include a wireless access point 12, a wired network 14, wireless communication devices 16A-16D (collectively "devices 16"), wireless links 18A-18D (collectively "wireless links 18"), and wired link 20.

Wireless communication network 10 provides an infrastructure for wireless communication between one or more wireless communications devices 16. Wireless communication network 10 may also provide access to wired network 14 for devices 16 associated with wireless communication network 10. Wireless communication network 10 may communicate data, voice, video, and the like between devices 16 and wired network 14 according to a variety of different wireless transmission formats.

Wireless access point 12 allows one or more of wireless communication devices 16 to associate with wireless communication network 10, and may relay data between different devices 16 within wireless communication network 10. In addition, wireless access point 12 may provide communication between devices 16 and a distribution system, e.g., wired network 14. Wireless access point 12 may be communicatively coupled to wired network 14 via wired link 20 and communicatively coupled to each of devices 16A-16D via wireless links 18A-18D respectively.

Wireless access point 12 may integrate a hub, switch, or router to serve multiple wireless communication devices 16. In some examples, wireless access point 12 may be equipped with WLAN station hardware to communicate with devices 16 that are associated with wireless communication network 10 and other devices that might be within the range of wireless access point 12. For example, wireless access point 12 may include a WLAN station card or board coupled to a host computer via an external or internal interface, including PCI, Mini PCI, USB, USB-2, Cardbus, IEEE 1394, SCSI, or PCMCIA interface unit.

Network 14 provides wired network functionality that can be accessed by devices 16 connected to wireless communication network 10. In some examples, network 14 may be a distribution system (DS) such as, e.g., an IEEE 802.3 distribution system. In additional examples, network 14 may be a local area network (LAN), wide area network (WAN), or global network such as the Internet. Network may be communicatively coupled to access point 12 via wired link 20.

Devices 16 are each configured to wirelessly communicate with access point 12. Each of the devices 16A-16D may establish a respective wireless link 18A-18D between wireless access point 12 and the respective device 16A-16D. In some examples, each of devices 16A-16D may associate with wireless access point 12 to establish the respective wireless link 18A-18D and join the wireless communication network 10. Devices 16 may provide wireless access to network 14 through access point 12. In addition, each of devices 16 may provide wireless communication to other devices 16 within wireless communication network 10 through access point 12. In some examples, devices 16 may be further configured to provide direct wireless communication between each other by establishing point-to-point wireless connections. Devices 16 may take a variety of forms including desktop computers, portable computers, personal digital assistants (PDAs), mobile telephones, multimedia devices, consumer electronics, or the like.

Similar to wireless access point 12, each of devices 16A-16D may be equipped with WLAN station hardware to provide association with wireless communication network 10. For example, devices 16 may each include a WLAN station card or board coupled to a host computer via an external or internal interface, including PCI, Mini PCI, USB, USB-2, Cardbus, IEEE 1394, SCSI, or PCMCIA interface unit. Each of devices 16A-16D may be communicatively coupled to access point 12 via wireless links 18.

Wireless access point 12 and wireless communication devices 16 may each form WLAN "stations," and may communicate according to one or more WLAN protocols such as those specified by one of the IEEE 802.11 standards. The IEEE 802.11 standards may include, e.g., the IEEE 802.11a standard, the IEEE 802.11b standard, the IEEE 802.11g standard, the IEEE 802.11n standard, etc. In some examples, wireless access point 12 may form an IEEE 802.11 access point station and each of devices 16A-16D may form an IEEE 802.11 non-access point station.

According to this disclosure, one or more of devices 16 and/or wireless access point 12 may implement the remote rate control techniques described herein. Devices 16 and access point 12 within wireless network 10 may operate, in some examples, as both transmitter devices and receiver devices. For a particular frame exchange sequence, one of devices 16 and/or access point 12 may act as a transmitter device, and another of devices 16 and/or access point 12 may act as a receiver device. When operating as transmitter devices, devices 16 and/or access point 12 may utilize a rate adaptation algorithm to select a physical layer transmission rate (i.e., PHY rate) for a particular frame exchange sequence. The receiver device that corresponds to the transmitter device may implement the remote rate control techniques described herein to remotely control the rate adaptation algorithm operating within the transmitter device.

Wireless communication network 10 is generally described herein in the context of the IEEE 802.11 standards for purposes of illustration. However, wireless communication network 10 may use other types of communication protocols within the same communications layer or within other communications layers without departing from the scope of this disclosure.

Figure 1B:
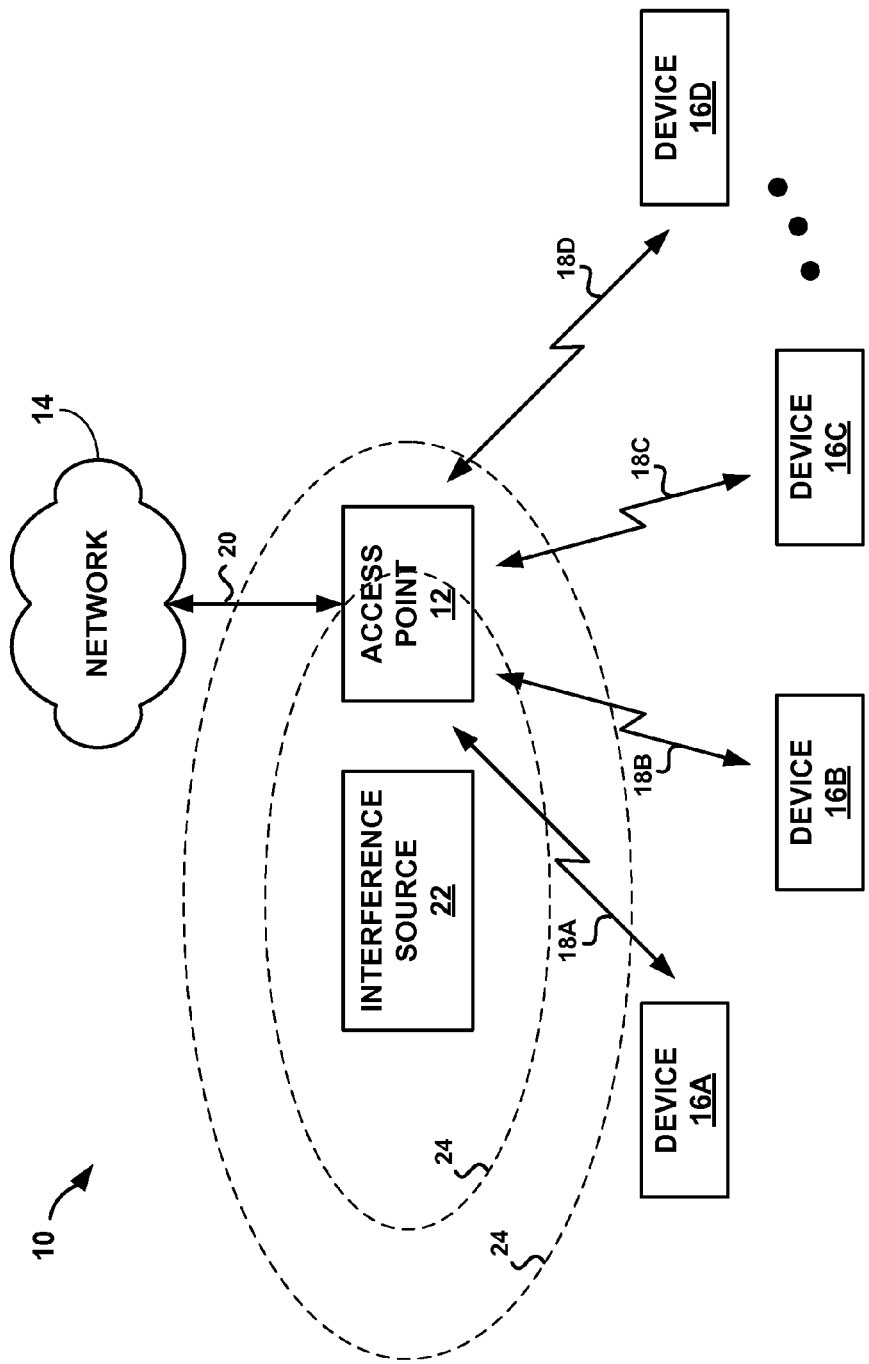
FIG. 1B is a block diagram illustrating the wireless communication network of FIG. 1A with an interference source.

FIG. 1B is a block diagram illustrating wireless communication network 10 of FIG. 1A with an interference source 22. Interference source 22 may be configured to produce channel interference 24. As shown in the example illustrated in FIG. 1B, channel interference 24 may overlap with one or more of the wireless channels used by wireless links 18.

In some examples, interference source 22 may be co-located with access point 12. As used herein, two or more different devices may be referred to, in some examples, as co-located devices if the devices are located proximate to each other. In additional examples, two or more devices may be referred to herein as co-located if they are attached to each other or share a common chassis to form a single composite device. In further examples, two or more wireless devices may be referred to herein as co-located devices if they have overlapping physical wireless transmission ranges. In additional examples, two or more wireless devices may be referred to herein as co-located devices if a first device produces interference that overlaps the physical transmission range of a second device. Any interference generated by a co-located device may be referred to herein as "co-located interference."

According to this disclosure, when access point 12 operates as a receiver device, access point 12 may, in some examples, use knowledge of the co-located interference source 22 and/or knowledge of co-located interference 24 generated by co-located interference source 22 to remotely control a transmitter-side rate adaptation algorithm. Although interference source 22 has been illustrated in FIG. 1B as being co-located with access point 12, in other examples, interference source 22 may be co-located with one of devices 16A-16D in addition to or in lieu of being co-located with access point 12.

Interference source 22 may include any device that produces any type of interference in a wireless channel, as well as, in some examples, a communications signal. For example, interference source 22 may include a cordless telephone base station, a cordless telephone handset, a mobile phone, a hands-free headset, a desktop personal computer (PC), a personal digital assistant (PDA), a portable computer, a mouse, a keyboard, a printer, a multimedia device, a microwave oven, consumer electronics, or the like.

In some examples, interference source 22 may form a cordless transmitter device configured to communicate according to a cordless protocol, such as, e.g., a Digital Enhanced Cordless Telecommunications (DECT) device, an Enhanced Digital Cordless Telecommunications (EDCT) device, or a World Digital Cordless Telecommunications (WDCT) device. In additional examples, interference source 22 may form a Bluetooth® device that communicates in accordance with a Bluetooth® protocol. In further examples, interference source 22 may include both a cordless transmitter device and a Bluetooth® device. In additional examples, interference source 22 may form a device that communicates in accordance with the Object Exchange (OBEX) protocol. In further examples, interference source 22 may include a WLAN station as described above with respect to FIG. 1A. In any of these examples, interference source 22 may be co-located with one or both of wireless access point 12 and one or more of the non-access point station devices 16.

Channel interference 24 may include any combination of electromagnetic signal and/or noise produced by interference source 22. In some examples, channel interference may include bursty interference. In other examples, channel interference 24 may include a continuous flow of non-bursty interference.

As used herein, "bursty interference" may refer to interference that occurs in discrete bursts of interference. In between the bursts of interference the bursty interference may include periods of substantially no interference referred to herein as "non-interference free-time" or "channel free-time." In other words, bursty interference, as used herein, may refer to any interference that is non-continuous or non-streaming. In examples where channel interference 24 is bursty, the length of an interference burst may be less than the length of the non-interference free time in-between the bursts. In other words, the interference may occur in relatively short bursts or spurts as compared to the amount of free time between the bursts.

The bursts of channel interference 24 may, in some examples, be substantially periodic. For example, the bursts of channel interference 24 may occur at substantially constant time intervals. In further examples, the time interval between burst occurrences may vary from burst to burst, but the minimum time interval between burst occurrences may be substantially constant.

In some examples, interference source 22 may include a device that performs wireless communication according to a time division multiplexing (TDM) protocol and/or a time division multiple access protocol (TDMA). Such an interference source 22 may, in some examples, produce bursty interference as described above. In further examples, such an interference source 22 may produce substantially periodic bursty interference as described above.

According to this disclosure, one or more of devices 16 and/or wireless access point 12 may implement the remote rate control techniques described herein. In some examples, the remote rate control techniques may prevent a catastrophic failure from occurring in wireless network 10 even in the presence of interference 24 that would normally cause such a failure.

For example, consider a case where device 16A is acting as a transmitter device and wireless access point 12 is acting as a receiver device. The two devices establish a wireless link 18A to use for a wireless communication session. Interference source 22 may be co-located with access point 12 and produce interference 24 that overlaps with wireless link 18A. During the communication session between device 16A and wireless access point 12, device 16A may send data frames to access point 12 over wireless link 18A. Channel interference 24 may, however, collide with one or more packets being transmitted over wireless link 18A. A collision between interference 24 and the frames transmitted over wireless link 18A may cause the transmitted frames to become corrupt and the frame exchange sequence to be unsuccessful.

In response to detecting the unsuccessful frame exchange sequence, the transmitter-side rate adaptation algorithm operating in device 16A may decide to reduce the physical layer data transmission rate (e.g., PHY rate) for subsequent frame transmissions. The rate adaptation algorithm may make this decision based on the assumption that a reduction in transmission rate will generally increase the probability of a successful frame exchange sequence. However, if interference 24 is bursty, the reduction in transmission rate may cause the packet length of subsequent transmissions to increase beyond the length of available free-time between interference bursts. This may cause substantially all of the future frame exchange sequences to fail (i.e., a catastrophic failure).

According to this disclosure, access point 12 may recognize that a further reduction in transmission rate may cause such a catastrophic failure and take proactive measures to prevent the transmitter-side rate adaptation algorithm from reducing the physical layer transmission rate. In some examples, access point 12 may cause device 16A to detect the interference-corrupted frame exchange sequence as being successful even though access point 12 knows that the frame exchange sequence was actually unsuccessful. Upon detecting the frame exchange sequence as being successful, the rate adaptation algorithm operating in device 16A may decide not to decrease the physical layer transmission rate. In some examples, device 16A may even increase the transmission rate. In any case, the proactive measures taken by access point 12 have prevented the packet length of subsequent transmissions from being increased in the same manner as that which was previously described thereby increasing the probability of successful future frame exchange sequences.

Thus, by causing device 16A to believe that the frame exchange sequence was successful, even though it actually was not successful, wireless access point 12 has successfully thwarted a catastrophic failure. In addition, wireless access point 12 may have also successfully increased the throughput of wireless link 18A over and above that which would have been obtainable without intervention by wireless access point 12.

The example described above was described in the context of a non-access point station (i.e., device 16A) acting as a transmitter device, and an access point station (i.e., access point 12) acting a receiver device for purposes of illustration. This disclosure also contemplates the reverse scenario where a non-access point station (e.g., device 16A) remotely controls a rate adaptation algorithm operating within an access point station (e.g., access point 12). In addition, as described in further detail with respect to FIGS. 2A and 2B, this disclosure also contemplates a first non-access point device remotely controlling a rate adaptation algorithm operating within a second non-access point device.

Figure 2A:
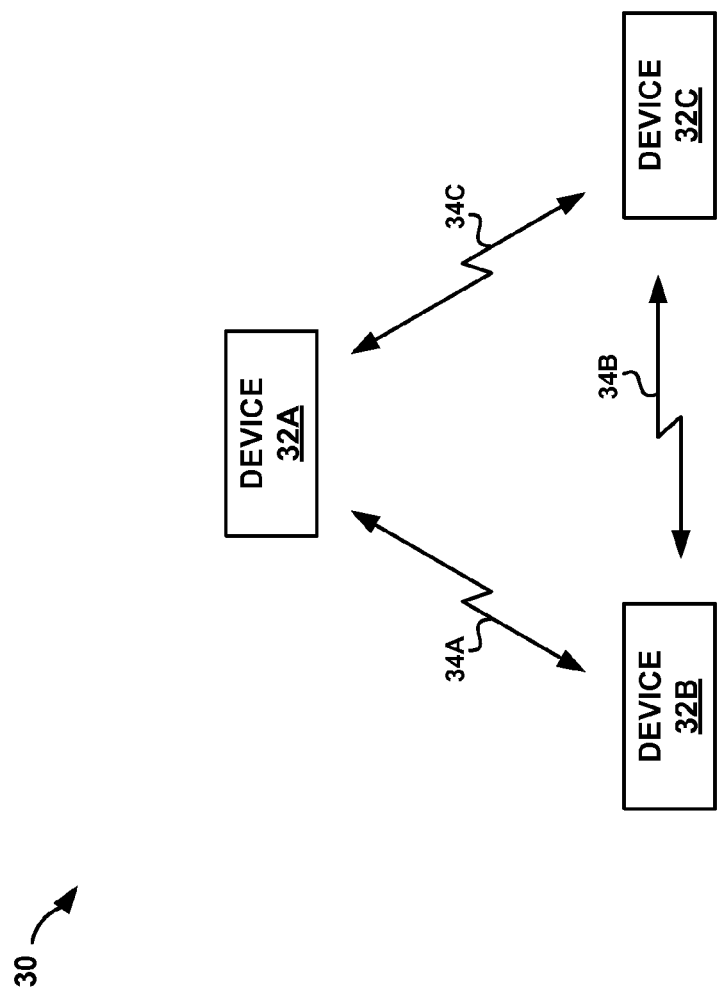
FIG. 2A is a block diagram illustrating another example wireless communication network according to this disclosure.

FIG. 2A is a block diagram illustrating another example wireless communication network 30 according to this disclosure. Wireless communication network 10 may include wireless communication devices 32A-32C (collectively "devices 32") and wireless links 34A-34C (collectively "wireless links 34").

Wireless communication network 30 provides an infrastructure for wireless communication between one or more wireless communications devices 32A-32C. Wireless communication network 10 may communicate data, voice, video, and the like between the devices according to a variety of different wireless transmission formats.

Wireless communication devices 32 are configured to establish direct wireless connections between each other for wireless communication via wireless links 34. In some examples, devices 32 may be further configured to wirelessly communicate with a wireless access point similar to devices 16 illustrated in FIGS. 1A and 1B. Devices 16 may take a variety of forms including desktop computers, portable computers, personal digital assistants (PDAs), mobile telephones, multimedia devices, consumer electronics, or the like.

Each of devices 32A-32C may be equipped with WLAN station hardware to provide association with wireless communication network 10. For example, devices 32 may each include a WLAN station card or board coupled to a host computer via an external or internal interface, including PCI, Mini PCI, USB, USB-2, Cardbus, IEEE 1394, SCSI, or PCMCIA interface unit. Each of devices 32A-32C may be communicatively coupled to one or more other devices 32A-32C in wireless network 30.

According to this disclosure, wireless communication devices 32A-32C may implement the remote rate control techniques described herein. For example, for a given frame exchange sequence, one of devices 32A may act as a transmitter device and another of devices 32B may act as a receiver device. The transmitter device 32A may utilize a rate adaptation algorithm to dynamically select a physical layer transmission rate for one or more frame exchange sequences. The receiver device 32B may remotely control the transmitter-side rate adaptation algorithm to decrease the likelihood of unsuccessfully transmitted frames. For example, receiver device 32B may remotely control the rate adaptation algorithm operating in transmitter device 32A to prevent catastrophic failure of point-to-point wireless link 34A and/or to increase throughput of wireless link 34A.

Figure 2B:
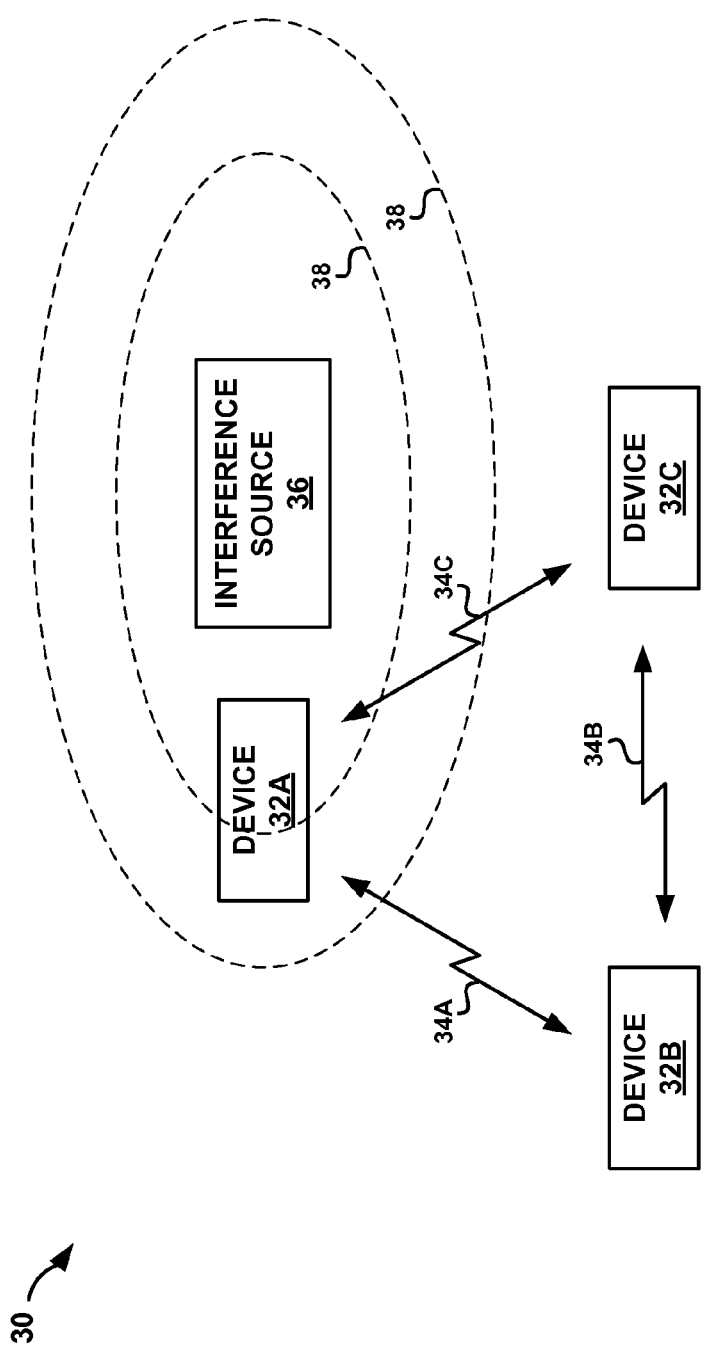
FIG. 2B is a block diagram illustrating the wireless communication network of FIG. 2A with an interference source.

FIG. 2B is a block diagram illustrating the wireless communication network 30 of FIG. 2A with an interference source 36. Interference source 36 may be configured to produce channel interference 38. As shown in the example illustrated in FIG. 2B, channel interference 38 may overlap one or more of the wireless channels used by wireless links 34A-34C.

Interference source 36 may include components that are similar to the components already described above with respect to interference source 22 shown in FIGS. 1A and 1B, and may operate in an identical or substantially similar fashion to interference source 22. For example, interference source 36 may generate, in some examples, bursty, non-bursty, and/or substantially periodic interference as described above with respect to interference source 22.

As shown in FIG. 2B, interference source 36 may be co-located with device 32A. According to this disclosure, when device 32A operates as a receiver, device 32A may, in some examples, use knowledge of the co-located interference source 36 and/or knowledge of co-located interference 38 generated by co-located interference source 36 to remotely control a transmitter-side rate adaptation algorithm. Although interference source 36 has been illustrated in FIG. 2B as being co-located with wireless device 32A, interference source 36 may be co-located with one or more of devices 32B and 32C in addition to or in lieu of device 32A.

In contrast to the access point topology of wireless network 10 shown in FIGS. 1A and 1B, wireless network 30 shown in FIGS. 2A and 2B has a point-to-point network topology. In other words, FIGS. 2A and 2B illustrate a network topology where non-access point devices 32 can form wireless communication sessions directly between each other via wireless links 34. In additional examples, a wireless network according to this disclosure may contain both access point connections as illustrated in FIGS. 1A and 1B as well as point-to-point connections as illustrated in FIGS. 2A and 2B.

Figure 3:
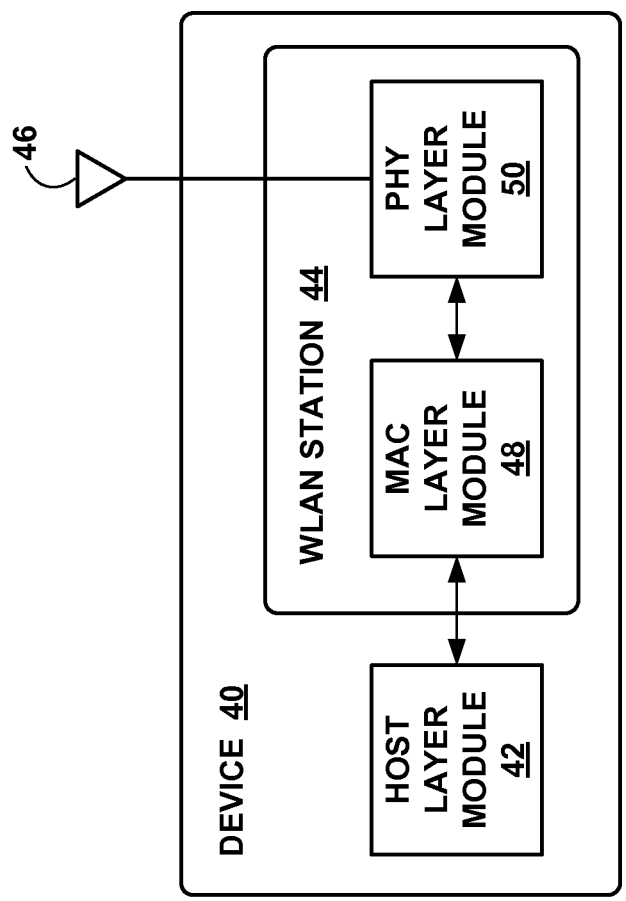
FIG. 3 is a block diagram illustrating an example wireless communication device according to this disclosure.

FIG. 3 is a block diagram illustrating an example wireless communication device 40 according to this disclosure. Wireless communication device 40 is configured to provide wireless communication with other wireless communication devices. Wireless communication device 40 may correspond to any of access point 12 illustrated in FIGS. 1A and 1B, wireless communication devices 16 illustrated in FIGS. 1A and 1B, and/or wireless communications devices 32 illustrated in FIGS. 2A and 2B. Wireless communication device 40 may include a host layer module 42, a WLAN station 44, and an antenna 46.

Host layer module 42 may be configured to issue commands and data to WLAN station 44 for the wireless transmission of data to other wireless communication devices. For example, host layer module 42 may issue a command to WLAN station 44 to transmit a particular frame of data to one or more wireless devices accessible via a wireless network. In some examples, host layer module 42 may issue the command and data as part of a data frame that includes data and control information. For example, host layer module 42 may issue the command and data as part of a MAC service data unit (MSDU), which may contain control information and the data to be transferred. In such examples, host layer module 42 may correspond to a Logical Link Control (LLC) layer within the Data Link layer (i.e., layer 2) of the OSI model. In further examples, host layer module 42 may interact with WLAN station according to an IEEE 802.11 communications protocol. In any case, host layer module 42 is capable of controlling WLAN station 44 to transmit data wirelessly to other devices.

Host layer module 42 may also be configured to receive data from WLAN station 44 that was wirelessly transmitted to device 40 from other devices and received by antenna 46. For example, host layer module 42 may receive the data from WLAN station 44 in the form of an MSDU. As another example, host layer module 42 may receive the data from WLAN station 44 according to an IEEE 802.11 communications protocol.

Host layer module 42 may also be configured to receive status data regarding whether the transmission of a particular data unit initiated by host layer module 42 (e.g., a frame, a packet, or an MDSU) was successful or unsuccessful. In some examples, the status data may originate in WLAN station 44. In additional examples, the status data may originate in another device. In response to receiving status data that indicates an unsuccessful transmission, host layer module 42 may direct WLAN station 44 to retransmit some or all of the data.

Host layer module 42 is communicatively coupled to WLAN station 44. In some examples, host layer module 42 may be communicatively coupled to network layers above those represented by host layer module 42. For example, if the host layer represents an LLC layer within the OSI model, host layer module 42 may be communicatively coupled to layers above the LLC layer. In additional examples, host layer module 42 may be communicatively coupled to a transport layer and/or an application layer. Host layer module 42 may service communication requests from one or more of the layers above the host layer.

WLAN station 44 is configured to provide wireless communication services to host layer module 42. In some examples, WLAN station 44 may provide MAC layer and PHY layer wireless communication services to host layer module 42. WLAN station 44 may be configured to receive and process commands from host layer module 42 and to wirelessly transmit data to another wireless communication device via antenna 46. In some examples, WLAN station 44 may receive the commands from host layer module 42 in the form of host layer data units, e.g., an MSDU. WLAN station 44 may also be configured to receive data from another device via antenna 46, perform error checking on the data, and relay the data to host layer module 42. WLAN station 44 may also be configured to provide status data to host layer module 42 regarding pending data transmissions initiated by host layer module 42. WLAN station 44 is communicatively coupled to host layer module 42 and antenna 46. WLAN station 44 may include media access control (MAC) layer module 48 and physical (PHY) layer module 50.

MAC layer module 48 is configured to provide MAC layer services to host layer module 42. Such services may include, e.g., addressing services and channel access services. In some examples, MAC layer module 48 may emulate a full-duplex logical communication channel. MAC layer module 48 may be configured to receive instructions from host layer module 42 to transmit a particular data unit to a remote device, select a particular physical layer transmission rate for transmission of the data unit, and coordinate with PHY layer module 50 to provide for the transmission of the data unit to the remote device.

MAC layer module 48 may generate MAC layer data units based on host layer data units received from host layer module 42, and pass the MAC layer data units to PHY layer module 50 for further processing. In some examples, the MAC layer data units may correspond to MAC protocol data units (MPDUs) and the host layer data units may correspond to MSDUs received from host layer module 42. In such examples, MAC layer module 48 may, in some examples, fragment a single MSDU into multiple MPDUs.

MAC layer module 48 may implement one or more different access techniques to coordinate access to the wireless channel. In some examples, MAC layer module 48 may transmit data according to a Distributed Coordination Function (DCF) technique, a Point Coordination Function (PCF) technique, or a Hybrid Coordination Function (HCF) technique as defined by the 802.11 standards. In additional examples, MAC layer module 48 may transmit data according to a Carrier Sense Multiple Access with Collision Avoidance (CSMA/CA). In such examples, MAC layer module 48 may sense the communication channel to see if the communication channel is busy prior to transmitting a packet. If the communication channel is busy, MAC layer module 48 may use an exponential backoff algorithm, e.g., a binary exponential backoff algorithm to help avoid network congestion.

In some examples, MAC layer module 48 may wirelessly transmit data according to a frame exchange sequence (FES). As part of the FES, MAC layer module 48 may transmit a data frame to a destination device, and wait to receive a positive acknowledgement. If the destination device receives the frame without any errors, the MAC layer in the destination device may send a positive acknowledgment frame or "ACK frame" back to MAC layer module 48 in device 40. After receiving the ACK frame, MAC layer module 48 may remove the data frame from the frame transmission queue and report a successful frame exchange sequence to host layer module 42.

If MAC layer module 48 does not receive an ACK frame for the transmitted data in a threshold amount of time, MAC layer module 48 may attempt to retransmit the frame and/or report to host layer module 42 that the frame exchange sequence was unsuccessful. If MAC layer module 48 attempts to retransmit the frame, MAC layer module 48 may use a rate adaptation algorithm to determine a new PHY rate to use for the retransmission of the frame. Once the ACK frame has been received or the maximum number of retries has occurred without success, the frame exchange sequence may be complete. If an ACK frame has been received, MAC layer module 48 may determine that the frame exchange sequence was successful. If an ACK frame has not been received, then the MAC layer module 48 may determine that the frame exchange sequence was unsuccessful.

As will be described in further detail in this disclosure, MAC layer module 48 may implement the remote rate control techniques described in this disclosure. For example, MAC layer module 48 may be configured to remotely control a rate adaptation algorithm performed by a remote device. For example, MAC layer module 48 may be configured to cause a MAC layer in a remote device to detect a packet as successfully transmitted when the packet was in fact not successfully transmitted.

PHY layer module 50 may be configured to process the MAC layer data units received from MAC layer module 48, and transmit the processed data over a wireless channel. In some examples, PHY layer module 50 may perform coding of the MAC layer data units according to a particular coding scheme at a particular coding rate. PHY layer module 50 may then modulate the coded data according to one or more modulation schemes.

PHY layer module 50 may code the data received from MAC layer module 48 according to an error correction coding technique to generate coded data. The coded data may form a codeword with data bits and parity bits. In some examples, the coding techniques used by PHY layer module 50 may include convolutional coding techniques, block coding techniques, turbo coding techniques, forward error correction (FEC) coding techniques, and the like. In some examples, PHY layer module 50 may use a particular coding rate to code the received data. Example coding rates include a one-half (½) coding rate, a two-thirds (⅔) coding rate, and a three-quarters (¾) coding rate.

PHY layer module 50 may modulate the coded data according to a variety of digital modulation techniques. The digital modulation techniques performed by PHY layer module 50 may convert a particular number of coded bits into a digital modulation symbol. Example digital modulation techniques used by PHY layer module 50 may include a Binary Phase-Shift Keying (BPSK) modulation technique, a Quadrature Phase-Shift Keying (QPSK) modulation technique, and a Quadrature Amplitude Modulation (QAM) modulation technique including, e.g., 16-QAM and 64-QAM.

In some examples, PHY layer module 50 may modulate the coded data onto multiple carriers or sub-carriers by using various spread spectrum techniques in conjunction with one or more of the digital modulation techniques described above. In other examples, PHY layer module 50 may modulate the coded data onto a single carrier using the digital modulation techniques described above with spread spectrum techniques. In examples where PHY layer module 50 uses spread spectrum techniques, PHY layer module 50 may use, e.g., a Direct-Sequence Spread Spectrum (DSSS) technique, a Frequency-Hopping Spread Spectrum (FHSS) technique, and/or an Orthogonal Frequency-Division Multiplexing (OFDM) technique.

PHY layer module 50 may modulate signals into a frequency band that substantially corresponds to the 2.4 gigahertz (GHz) Industrial, Scientific and Medical (ISM) frequency band. In some examples, such a frequency band may span from approximately 2.4 GHz to approximately 2.4835 GHz. In additional examples, PHY layer module 50 may modulate signals into a frequency band that substantially corresponds to the 5 GHz ISM frequency band. The carrier signal may, in some examples, be a radio frequency (RF) carrier signal or an infrared light carrier signal.

PHY layer module 50 may generate modulated data for antenna 46 to wirelessly transmit to a destination device. In some examples, antenna 46 may be an RF antenna configured to transmit modulated RF carrier signals. In other examples, antenna 46 may be an infrared light source/detector configured to send and detect modulated infrared light carrier signals. In the example wireless communication device 40 of FIG. 3, wireless communication device 40 is illustrated with only one antenna 46. However, in other examples, wireless communication device 40 may include two or more antennas.

As used herein, "physical layer transmission rate" may refer to the rate used by the physical layer for the transmission of data. In some examples, the actual physical layer transmission rate for a particular frame exchange sequence may be selected from a set of predetermined physical layer transmission rates. Each of the predetermined physical layer transmission rates may be define or correspond to a particular combination of one or more of the following: the digital modulation scheme used for transmission, the spread spectrum techniques used for transmission if any, and the coding rate used for coding of the data. In additional examples, the physical layer transmission rates may be indicative of a number of data bits encoded within each modulation symbol. Thus, the physical layer transmission rate may, in some examples, not correspond to the actual data throughput of the communications link but rather to the physical modulation and coding techniques used by PHY layer module 50 to transmit and receive data. Example physical layer transmission rates include 1, 2, 6, 9, 12, 18, 24, 36, 48, and 54 megabits per second (Mbps) transmission rates. In some examples, the physical layer data transmission rate may correspond to an IEEE 802.11 PHY rate.

In some examples, wireless communications device 40 and/or one or more of the modules within wireless communications device 40 may be implemented as one or more processors. The one or more processors may, in some examples, have instructions stored therein that when executed by the one or more processors perform any of the techniques described in this disclosure. In additional examples, wireless communications device 40 and/or one or more of the modules within wireless communications device 40 may be implemented as one or more software modules. In further examples, one or more of the modules within wireless communications device 40 may be implemented as individual devices.

Figure 4:
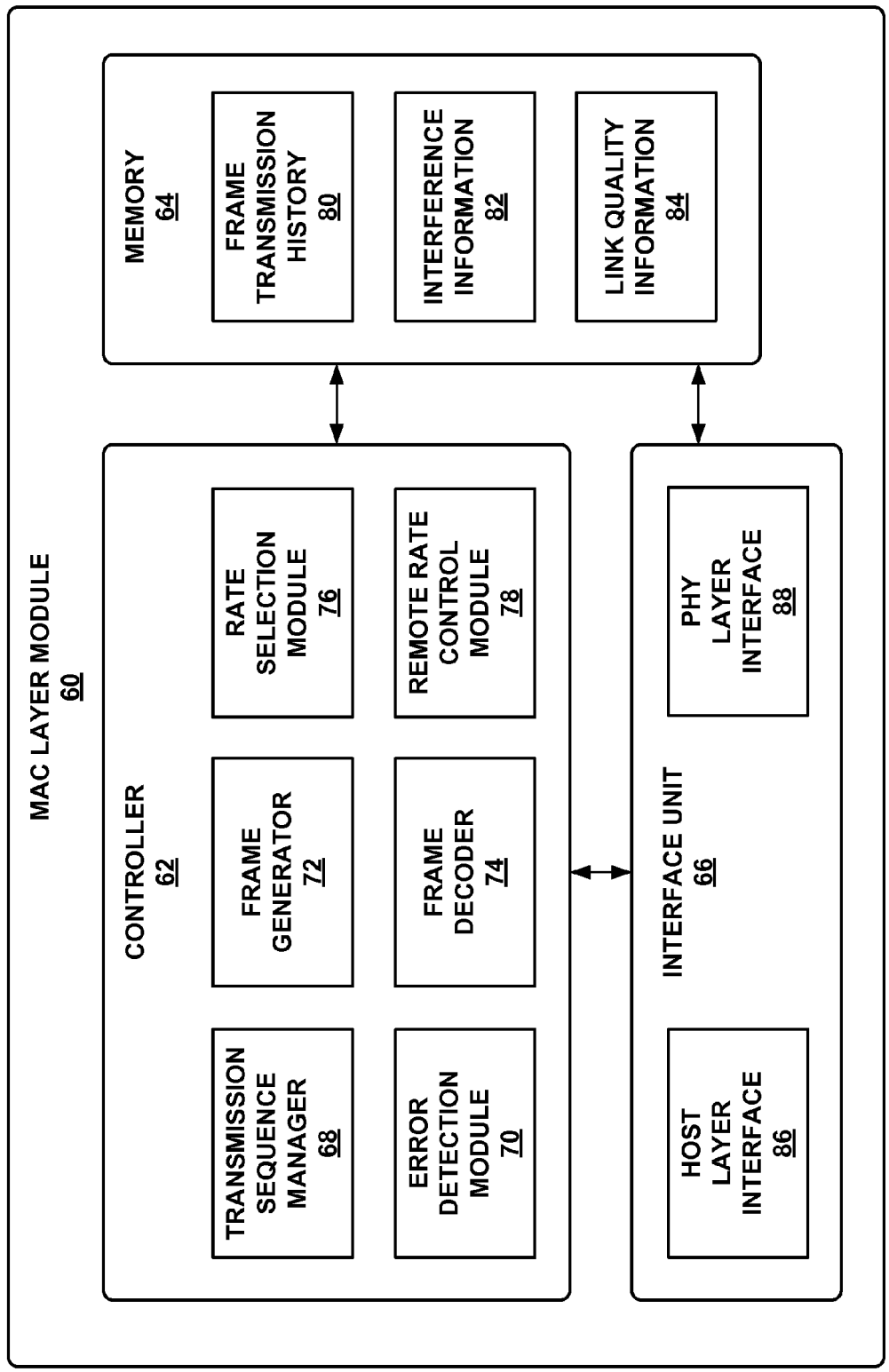
FIG. 4 is a block diagram illustrating an example media access control (MAC) layer according to this disclosure.

FIG. 4 is a block diagram illustrating an example media access control (MAC) layer module 60 according to this disclosure. In some examples, MAC layer module 60 may correspond to MAC layer module 48 illustrated in FIG. 3. MAC layer module 60 may include controller 62, memory 64, and interface unit 66.

MAC layer module 60 is configured to provide MAC layer services to a host layer. The host layer may be any type of application or service. In some examples, the host layer may correspond to host layer module 42 shown in FIG. 3. MAC layer module 60 may interact with a PHY layer to handle the wireless transmission of data for the host layer. In some examples, the PHY layer may correspond to PHY layer module 50 shown in FIG. 3. MAC layer module 60 may be communicatively coupled to a host and to a PHY layer via interface unit 66.

Controller 62 is configured to control the operations of MAC layer module 60 including the execution of frame exchange sequences. Controller 62 may also be configured to access memory 64 to store data used by controller 62 and to communicate with interface unit 66 to exchange data with other layers and/or devices. Controller 62 may include transmission sequence manager 68, error detection module 70, frame generator 72, frame decoder 74, rate selection module 76, and remote rate control module 78.

Memory 64 is configured to store information used by MAC layer module 60 for frame exchange sequences and remote rate control. Memory 64 is communicatively coupled to controller 62. In some examples, memory 64 may also be communicatively coupled to interface unit 66. Memory includes frame transmission history 80, interference information 82, and link quality information 84. Memory 18 may be implemented, in some examples, with a volatile storage device. For example, memory 18 may be implemented as random access memory (RAM) such as synchronous dynamic random access memory (SDRAM), embedded dynamic random access memory (eDRAM), static random access memory (SRAM), or the like.

Interface unit 66 is configured to provide communication between MAC layer module 60 and other layers or devices. Interface unit 66 is communicatively coupled to controller 62. In some examples, interface unit 66 may be communicatively coupled to memory 64. Interface unit 66 may include host layer interface 86 and PHY layer interface 88.

Transmission sequence manager 68 is configured to manage and execute frame exchange sequences performed by MAC layer module 60. In general transmission sequence manager 68 may perform a frame transmit sequence and a frame receive sequence. When transmission sequence manager 68 is performing the transmit sequence, transmission sequence manager 68 is acting as a transmitter. Similarly, when transmission sequence manager 68 is performing the receive sequence, transmission sequence manager 68 is acting as a receiver.

The frame transmit sequence may be initiated by a host via host layer interface 86. In some examples, the host may issue a command to MAC layer module 60 to transmit a particular data unit. In other examples, the host may provide MAC layer module 60 with a data frame containing command data and user data. For example, the data frame may be an MSDU.

Transmission sequence manager 68 may receive the data unit or data frame from the host and direct frame generator 62 to append one or more parity bits to the frame to generate a MAC layer data frame. In some examples, the MAC layer data frame may be an MPDU, which includes a Frame Check Sequence (FCS).

Transmission sequence manager 68 may request a particular PHY rate from rate selection module 76 to use for transmission of the data frame. After receiving the PHY rate from rate selection module 76, transmission sequence manager 68 may instruct PHY layer interface 88 to transmit the MAC layer data frame at the PHY rate determined by rate selection module 76.

Transmission sequence manager 68 may reset and start an ACK timer. Transmission sequence manager 68 may then wait until either an ACK frame is received via PHY layer interface 88 or the ACK timer expires. In some examples, transmission sequence manager 68 may place a copy of the MAC layer data frame in a frame transmission queue in memory 64. The frame transmission queue may store the frame until an ACK frame as been received or the frame is otherwise discarded due to an unsuccessful transmission.

If the ACK timer expires prior to reception of an ACK frame, transmission sequence manager 68 may determine if a retry should occur. Such a determination may be based on many factures including, e.g., whether the host has requested a particular number of retries for the frame or whether a default threshold number of retries has already occurred.

If transmission sequence manager 68 determines to retry transmission of the frame, transmission sequence manager 68 may report the unsuccessful frame transmission to rate selection module 76 and request a new PHY rate. Rate selection module 76 may use a rate adaptation algorithm (e.g., a rate fallback algorithm) to determine a physical layer transmission rate for the retry frame exchange sequence. In some examples, the transmission rate for the retry frame exchange sequence may be lower than that which was used for the original frame exchange sequence. Similarly, for subsequent retries, the transmission rate may be lower than that which was used for the previous retry.

After receiving the new PHY rate, transmission sequence manager 68 may instruct PHY layer interface 88 to transmit the retry frame at the new PHY rate. Similar to the original transmission, transmission sequence manager 68 may start an ACK timer and wait for an ACK. Transmission sequence manager 68 may also store a status indicator in the frame transmission queue indicating that retry has taken place.

If the ACK timer expires prior to reception of an ACK frame and transmission sequence manager 68 determines that no retry should take place, then transmission sequence manager 68 may drop the frame, and remove the frame from the transmission queue. Transmission sequence manager 68 may report to host via host layer interface 86 that the requested data transfer was unsuccessful. In some examples, transmission sequence manager 68 may store this information in frame transmission history 80, report the information to rate selection module 76, and/or report the information to remote rate control module 78.

If an ACK is received before the ACK timer is expired, then transmission sequence manager 68 may determine that the frame exchange sequence was successful. In other words, transmission sequence manager 68 may determine that the receiver device received the transmitted frame without any errors. Transmission sequence manager 68 may remove the frame from the transmission queue. Transmission sequence manager 68 may also report the results to the host via host layer interface 86.

In some examples, transmission sequence manager 68 may store information regarding the successful frame exchange sequence in frame transmission history 80. For example, transmission sequence manager 68 may store the physical layer transmission rate for the frame exchange sequence. In further examples, transmission sequence manager 68 may report the successful frame exchange sequence to rate selection module 76 and/or remote rate control module 78 for use in future decisions.

The frame receive sequence may be initiated when a transmitted data frame is received from PHY layer interface 88. After receiving the data frame, transmission sequence manager 68 may direct error detection module 70 to determine if there are any errors within the received frame. If the received frame passes the error detection test (e.g., there are no detected errors), then transmission sequence manager 68 may direct frame decoder 74 to decode the frame. Transmission sequence manager 68 may also direct frame generator 72 to generate an ACK frame for the received frame, and direct PHY layer interface 88 to send the ACK frame to the transmitter device.

After decoding has completed, transmission sequence manager 68 may relay the decoded data to the host via host layer interface 86. In some examples, the decoded data may take the form of an MSDU.

In some examples, transmission sequence manager 68 may store information regarding the successful frame exchange sequence in frame transmission history 80. For example, transmission sequence manager 68 may store the physical layer transmission rate for the frame exchange sequence. In further examples, transmission sequence manager 68 may report the successful frame exchange sequence to rate selection module 76 and/or remote rate control module 78 for use in future decisions.

If the received frame fails the error detection test (e.g., the frame is corrupted), then transmission sequence manager 68 may direct remote rate control module 78 to determine whether a positive acknowledgement should be sent to the transmitter device even though the received frame was corrupted. Remote rate control module 78 may use one or more of frame transmission history 80, interference information 82 and/or link quality information 84 to determine whether to send an ACK frame. In some examples, remote rate control module 78 may consider whether a further reduction of the physical layer transmission rate would reduce the likelihood of subsequent frame exchange sequence being successful. In further examples, remote rate control module 78 may consider whether the received packet is more likely to be corrupted due to factors other than distance between the transmitter and receiver rather than due to distance.

In any case, if remote rate control module 78 determines that a positive ACK should be sent to the transmitter device, then transmission sequence manager 68 may direct frame generator 72 to generate an ACK frame for the received frame, and direct PHY layer interface 88 to send the ACK frame to the transmitter device. Transmission sequence manager 68 may relay the corrupted frame to the host via host layer interface 86.

In some examples, the host may determine to request retransmission of the corrupted frame. In other examples, the host may determine that the corrupted frame is acceptable for the particular application, and not request retransmission of the corrupted file. However, since a positive ACK was sent to the transmitter device, the MAC layer in the transmitter device will not retransmit the frame without a request by the host layer. In this manner, the remote rate control techniques in this disclosure effectively "off-load" the erroneously received MAC-layer frames to higher layers within the network communications model.

If remote rate control module 78 determines that a positive ACK should not be sent to the transmitter device, transmission sequence manager 68 may not send an ACK frame. In either case, transmission sequence manager 68 may keep track of the attempted frame deliver and physical layer transmission rate in frame transmission history 80. Transmission sequence manager 68 may also report the unsuccessful frame exchange sequence and transmission rate to rate selection module 76.

In some examples, if the received frame is corrupted, transmission sequence manager 68 may first check the destination address of the received packet to verify that the destination address matches the MAC address of MAC layer module 60. For example, MAC layer module 60 may have a unique MAC address, e.g., a 48-bit number. If the destination address does not match the MAC address of MAC layer module 60, then transmission sequence manager 68 may decide not to send an ACK frame in response to receiving a corrupted packet even if remote rate control module 78 would recommend sending such an ACK frame. This prevents transmission sequence manager 68 from sending an ACK frame in response to receiving a transmission packet that was never intended to be received by MAC layer module 60.

In additional examples, transmission sequence manager 68 may not only check to make sure the destination MAC address matches, but may also check to ensure that the destination Basic Service Set Identifier (BSSID) identified in the received packet matches the BSSID associated with MAC layer module 60. If the BSSID identifiers and MAC addresses match, then transmission sequence manager 68 may send an ACK frame in response to receiving a corrupted frame. Otherwise, if one or both of the BSSID and MAC addresses do not match, transmission sequence manager 68 will not send an ACK frame in response to receiving a corrupted frame.

Error detection module 70 is configured to detect whether a frame received from the PHY layer is corrupted. Error detection module 70 may implement any error detection or correction algorithm including, e.g., a convolutional code algorithm a block code algorithm. In one example, error detection module 70 may use frame check sequence (FCS) bits that are appended to the frame to perform error detection. In such examples, the frame may be determined to be corrupted if an FCS error occurs. Error detection module 70 may report the results of the error detection to transmission sequence manager 68. The results may include an indicator that indicates whether a given frame passed or failed the error detection test. In some examples, error detection module 70 may store the results in frame transmission history or report the results to rate selection module 76 and/or remote rate control module 78.

In some examples, controller 62 may keep track of the PHY rates used by each station that with which it is in communication. For example, error detection module 70 may detect the PHY rate of a transmitted packet and store this PHY rate in transmission history 80 of memory 64 or within controller 62. The detected PHY rate may be used by remote rate control module 78 to remotely control the transmitter-side rate adaptation algorithm. In some examples, error detection module 70 may extract the PHY rate from the FCS-Error Frame.

Frame generator 72 is configured to generate a MAC layer frame based on data received from a host layer. In some examples, the data received from host-layer may be part of a host-layer data frame. Frame generator 72 may, in some examples, fragment the data received from a single host-layer data frame into multiple MAC layer data frames for transmission to a remote device.

The MAC layer frame may be a data frame or a control frame. A data frame, as used herein, may refer to a frame that is used primarily for the purpose of transmitting user data. A data frame may be generated based at least in part on data received from a host via host layer interface 86. A control frame, as used herein, may refer to a frame that is used primarily for the purposes of controlling a frame exchange sequence. A control frame may not necessarily contain user data.

Data frames may include unicast frames, multicast frames, and/or broadcast frames. A unicast frame may be directed to a single destination device, a multicast frame may be directed to multiple destination devices, and a broadcast frame may be directed to all devices associated with the network.

Control frames may include positive acknowledgement (ACK) frames. In general a positive ACK frame may indicate that a data frame was successfully received by the receiver device and was not corrupted. A frame may be determined to be corrupted if at least one error is detected by error detection module 70. Similarly, a frame may be determined to be not corrupted if no errors are detected by error detection module 70. A negative ACK frame may indicate that a data frame was corrupted. In some examples, the frame exchange sequences managed by transmission sequence manager 68 may include positive ACK frames, but not negative ACK frames. In further examples, the frame exchange sequences may include both positive ACK frames and negative ACK frames.

The positive ACK frame, as used herein, may refer to non-block ACK frames and block ACK frames. A non-block ACK frame may refer to an acknowledgement that is sent in response to a single MAC layer data frame (e.g., MPDU) that is successfully transmitted. A block ACK frame may refer to an acknowledgement that is sent in response to receiving multiple MAC layer data frames (e.g., MPDUs). A block ACK may include multiple bits each of which represents a status indicator for an individual MAC layer data frame that was transmitted.

In any case, frame generator 72 may generate control frames and data frames based on instructions received from transmission sequence manager 68. In addition to placing data and control information in the frames, frame generator 72 may also append error control information, such as parity bits for example, to the frame. In some examples, frame generator 72 may append a frame check sequence (FCS) to the frame. The FCS may, in some examples, be calculated as specified in the IEEE 802.11 standard communication protocols.

Frame decoder 74 is configured to decode a frame received from the PHY layer via PHY layer interface 88. In some examples, frame decoder 74 may extract the data portion of the received frame and relay the data to a host via host layer interface 88. In additional examples, may assemble the extracted data into a host-layer data frame (e.g., an MSDU) and provide the host-layer data frame to the host. In further examples, frame decoder 74 may assemble or defragment data extracted from multiple MAC layer data frames into a single host-layer data frame.

Rate selection module 76 is configured to determine or select a physical layer data transmission rate for the transmission of one or more frames. Rate selection module 76 may be configured to perform a rate adaptation algorithm that dynamically varies the physical layer transmission rate of frame transmissions based on various factors.

In some examples, the rate adaptation algorithm may be a rate fallback algorithm that reduces the physical layer data transmission rate as the number or percentage of detected unsuccessful frame exchange sequences increases. In some examples, the rate fallback algorithm may select a physical layer transmission rate for subsequent transmissions based on whether previous frame exchange sequences were successful or unsuccessful. For example, when the percentage of unsuccessful frame exchange sequences reaches an upper threshold, rate selection module 76 may determine to decrease the PHY rate for subsequent frame exchange sequences. Likewise, when the rate of successful frame exchange sequences reaches a lower threshold, rate selection module 76 may decide to increase the PHY rate for subsequent frame exchange sequences. In such examples, the rate fallback algorithm may be an ACK-based rate fallback algorithm that uses information as to whether positive acknowledgements were received from the receiver device for a given transmitted frame to subsequent PHY rates.

In some examples, rate selection module 76 may perform a Received Signal Strength Indicator (RSSI)-based rate fallback algorithm. Such an algorithm may use the RSSI of one or more recently received frames to select a rate for subsequent frame transmissions. In other examples, rate selection module 76 may not be configured to perform an RSSI-based rate fallback algorithm. In additional examples, rate selection module 76 may be configured to perform one or more of the following rate fallback algorithms: an Automatic Rate Fallback (ARF) algorithm, an Onoe rate control algorithm, an Adaptive Multi Rate Retry (AMRR) algorithm, and a Sample Rate algorithm.

Rate selection module 76 may use information received from transmission sequence manager 68, error detection module 70, remote rate control module 78 and/or memory 64 to select a PHY rate for a particular frame exchange sequence. For example, rate selection module 76 may use information indicating that a frame about to be transmitted is a retransmitted frame or that the previous frame exchange sequence was unsuccessful. Such information may be received from frame sequence manager 68 and/or error detection module 70. As another example, rate selection module 76 may use information regarding channel interference, link quality, and/or transmission history to select a PHY rate. Such information may be received from remote rate control module 78 and/or memory 64.

Remote rate control module 78 is configured to remotely control a transmitter-side rate adaptation algorithm. It should be noted that remote rate control module 78 may not necessarily control rate adaptation performed by rate selection module 76 of the same WLAN station. Rather, remote rate control module 78 may control a rate adaptation algorithm performed by a separate transmitter device from which MAC layer module 60 receives transmitted frames. In other words, remote rate control module 78 may remotely control a transmitter-side rate adaptation algorithm that is located on a WLAN station different from that which includes remote rate control module 78.

According to this disclosure, remote rate control module 78 may determine whether transmission sequence manager 68 should send a positive ACK to the transmitter device in response to receiving a corrupted packet. In additional examples, remote rate control module 78 may determine a target outcome for a rate adaptation algorithm performed on a remote device (e.g., a transmitter device). In some examples, the target outcome may be a determination as to whether transmission sequence manager 68 should prevent the rate adaption algorithm from reducing the PHY rate for subsequent frame transmission sequences.

Frame transmission history 80 may store information related to frame transmission statistics and frame data. In some examples, frame transmission history 80 may include a frame transmission queue that stores data for frames that are currently in transit and for which transmission sequence manager 68 is waiting to receive an ACK frame. Frame transmission history 80 may also store information indicating the number of retries that have occurred with respect to a particular frame. In some examples, frame transmission history 80 may store statistical and/or historical information regarding PHY rates that produced successful frame exchange sequences and/or unsuccessful frame exchange sequences. These PHY rates may be related to frame exchange sequences that originated at the transmitter and frame exchange sequence that originated at the receiver.

Interference information 82 may store information related to known channel interference conditions and/or channel interference characteristics that have been detected by PHY layer or a channel interference detector. Known channel interference conditions 82 may include information regarding a co-located interference source and/or the type of interference generated by a co-located interference source. Such information may have been known at the time of manufacture or subsequently provided to MAC layer module 60 during operation of the device.

Detected channel interference characteristics may include information regarding channel interference that was detected by the PHY layer or another channel monitoring device. Detected channel interference characteristics may also include information that was derived or inferred about channel interference based on other factors such as, e.g., previous frame exchange sequences. For example, the period of bursty channel interference may be inferred if unsuccessful frame exchange sequences occur at regular time intervals.

Link quality information 84 may store information related to the quality of the link between a transmitter device and a receiver device. In some examples, link quality information 84 may include information related to the power level of a signal received over the communications link. In further examples, link quality information 84 may include RSSI information. In some examples, link quality information 84 may include information that was derived or inferred about the link quality based on other factors. For example, link quality information 84 may include link quality information that was derived based on the history of retries and/or or the number of retries that have occurred for a particular link.

Host layer interface 86 is configured to provide two-way communication between controller 62 and a host layer. In some examples, host layer interface 86 may also provide communication directly between memory 64 and the host layer. Host layer interface 86 may receive commands and data from the host layer and relay such information to controller 62. Host layer interface 86 may also relay received data and transmission status information to the host layer. In some examples, host layer interface 86 may use IEEE 802.11 MSDUs to pass data and control information between controller 62 and the host layer.

PHY layer interface 88 is configured to provide two-way communication between controller 62 and a PHY layer. In some examples, PHY layer interface 88 may also provide communication directly between memory 64 and the PHY layer. Controller 62 may use PHY layer interface 88 to instruct the PHY layer to transmit a particular data frame at a particular PHY rate. PHY layer interface 88 may also relay data frames received from PHY layer to controller 62 for processing. In some examples, PHY layer interface 99 may use IEEE 802.11 MPDUs to pass data and control information between controller 62 and the PHY layer.

In some examples, controller 12 and/or one or more of the modules illustrated in FIG. 4 may be implemented as one or more processors. The one or more processors may, in some examples, have instructions stored therein that when executed by the one or more processors perform any of the techniques described in this disclosure. In additional examples, controller 12 and/or one or more of the modules illustrated in FIG. 4 may be implemented as one or more software modules. In further examples, one or more of the modules illustrated in FIG. 4 may be implemented as individual devices.

Figure 5:
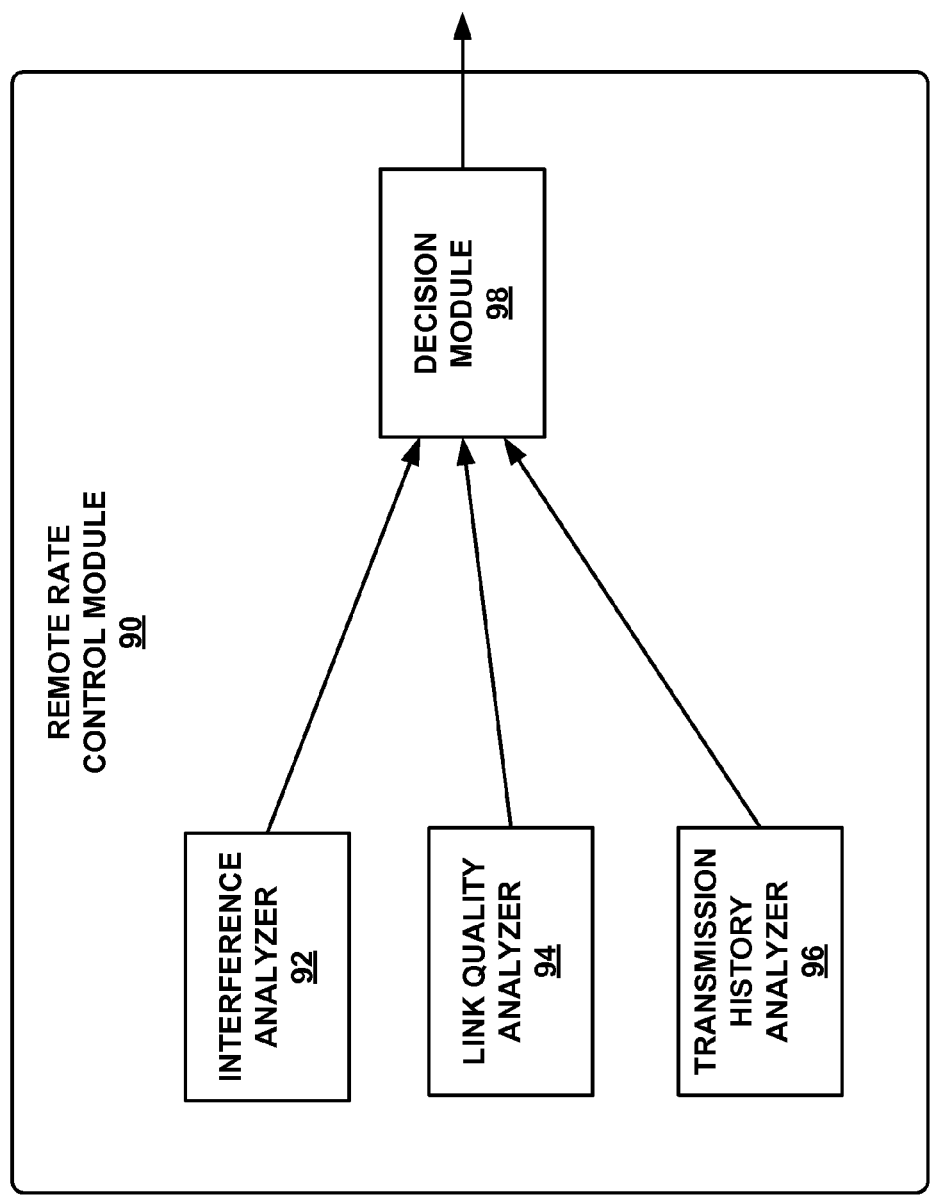
FIG. 5 is a block diagram illustrating an example remote rate control module according to this disclosure.

FIG. 5 is a block diagram illustrating an example remote rate control module 120 according to this disclosure. Remote rate control module 120 is configured to remotely control a rate adaptation algorithm operating on a remote device. Remote rate control module 120 may include an interference analyzer 92, a link quality analyzer 94, and a transmission history analyzer 96, and a decision module 98.

Interference analyzer 92 is configured to gather and analyze data regarding characteristics of the channel interference, and provide the resulting data to decision module 98. In some examples, interference analyzer 92 may determine whether channel interference is bursty or non-bursty. If the channel interference is bursty, interference analyzer 92 may determine if the bursts occur at substantially regular intervals. If the bursts occur at substantially regular intervals, interference analyzer 92 may determine the period of the bursts. In addition, interference analyzer 92 may determine the length or average length of the bursts as well as the amount or average amount of free time between successive bursts.

In some examples, interference analyzer 92 may use a priori knowledge of interference sources and/or types of interference generated by a particular interference source to assist in the analysis of channel interference characteristics. For example, interference analyzer 92 may use a priori knowledge of a co-located device to assist in analysis of the interference characteristics.

Link quality analyzer 94 is configured to gather and analyze data regarding the quality of the wireless link, and provide the resulting data to decision module 98. In some examples, link quality analyzer 94 may detect the raw power level of the received signal to determine the quality of the wireless link. In additional examples, link quality analyzer 94 may use an RSSI to determine the quality of the wireless link. In further examples, link quality analyzer 94 may use a signal-to-noise (SNR) to determine the quality of the wireless link. Link quality analyzer 94 may also gather information related to frame transmission history, such as the number of retries for example, to assist in determining the quality of the link.

Transmission history analyzer 96 is configured to gather and analyze data regarding the transmission history, and provide the resulting data to decision module 98. In some examples, transmission history analyzer 96 may correlate information regarding whether a frame exchange sequence was successful or unsuccessful with information regarding the PHY rate used for the frame transmission sequence to determine which PHY rates are likely to produce successful frame exchange sequences. In further examples, transmission history analyzer 96 may correlate information regarding the number of retries that have occurred for previous transmissions with information regarding the PHY rate used for the frame transmission sequence to determine which PHY rates are likely to produce successful frame exchange sequences.

Decision module 98 is configured to make a decision regarding the control of a rate adaptation algorithm operating on a remote device. Decision module 98 may make the decision based on data provided by one or more of interference analyzer 92, link quality analyzer 84, and transmission history analyzer 96.

In some examples, decision module 98 may establish a minimum physical layer transmission rate based on the information received from one or more of analyzers 92, 94, and 96. In some examples, the minimum physical layer transmission rate may be a transmission rate below which decision module 98 determines that the probability of unsuccessful frame exchanges increases. In further examples, the minimum physical layer transmission rate may be a transmission rate below which decision module 98 determines that a catastrophic failure may occur.

Decision module 98 may use the minimum physical layer transmission rate as a threshold transmission rate for determining whether to prevent the transmitter-side rate adaptation algorithm from further reducing the transmission rate. For example, decision module 98 may compare a current transmission rate for the most recently received packet to the threshold transmission rate. If the current transmission rate is at or below the threshold transmission rate, decision module 98 may decide to prevent the rate adaptation algorithm from further reducing the PHY rate. Otherwise, if the current transmission rate is above the threshold transmission rate, decision module 98 may decide to not prevent the rate adaptation algorithm from further reducing the PHY rate.

In some examples, decision module 98 may establish the minimum physical layer transmission rate based on characteristics of the channel interference. For example, if the channel interference is bursty, decision module 98 may estimate the period of the bursts, the frequency of the bursts, or the amount of free channel time between the bursts. Decision module 98 may also determine the packet transmission time for standard packets transferred at particular PHY rates. Based on this information, decision module 98 may determine a PHY rate that produces a maximum packet transmission time for which a packet is likely to be successfully transmitted. For example, decision module 98 may require the maximum packet transmission time to be less than the free channel time between bursts or less than the period of the bursts. As another example, decision module 98 may require the maximum packet transmission time to be less than a percentage of the free channel time between bursts.

In further examples, decision module 98 may establish the minimum physical layer transmission rate based on the link quality analysis. For example, decision module 98 may determine a threshold signal strength above which packets are more likely to be corrupted due to interference rather than due to the quality of the link or the distance between the transmitter and receiver device. In other words, if the signal strength is high enough, decision module 98 may reasonably assume that poor link quality and/or distance is not the primary factor as to why packets may become corrupted and that channel interference may be the primary factor. Then, decision module 98 may determine the minimum physical layer transmission rate which produces a signal strength that is at or above the threshold signal strength.

Thus, decision module 98 may use a minimum physical layer transmission rate established in this manner to determine whether packets are more likely to be corrupted due to interference rather than due to the quality of the link or the distance between the transmitter and receiver device. If decision module 98 determines that the cause of corrupted packets is more likely to be channel interference (e.g., the signal strength is at or above the threshold), then decision module 98 may decide to prevent the rate adaptation algorithm from further reducing the PHY rate. Otherwise, if decision module 98 determines that the cause of corrupted packets is more likely to be poor link quality and/or the distance between devices (e.g., the signal strength is below the threshold), decision module 98 may decide to not prevent the rate adaptation algorithm from further reducing the PHY rate. In some example, decision module 98 may use information received from interference analyzer 92 in addition to link quality analyzer 94 to determine the minimum physical layer transmission rate.

In some examples, decision module 98 may determine whether to send a positive ACK frame in response to receiving a corrupted packet. For example, if decision module 98 decides to prevent the rate adaptation algorithm from further reducing the PHY rate, decision module 98 may decide to send a positive ACK frame in response to receiving a corrupted packet. On the other hand, if decision module 98 decides not to prevent the rate adaptation algorithm from further reducing the PHY rate, decision module 98 may decide to not send a positive ACK frame in response to receiving a corrupted packet.

In further examples, decision module 98 may decide to send positive ACK frames in response to receiving corrupted packets only a certain percentage of the time. For example, decision module 98 may establish one or more probability vectors that associate a percentage of forced ACK frames that may be sent out for a given PHY rate. For example, the probability vectors may specify that a forced ACK should be sent out 100% of the time if the PHY rate relatively low, and that a forced ACK should be sent out only 90% of the time if the PHY rate is relatively high. In this manner, decision module 98 may be able to fine tune the rate adjustments of the transmitter-side rate adaptation algorithm.

Although remote rate control module 90 illustrated in FIG. 5 includes three analyzer modules 92, 94, 96, other examples may have more or less analysis modules. In addition, some examples may combine the functionality of one or more the analysis modules and/or decision module 98 into a composite analysis module.

Figure 6:
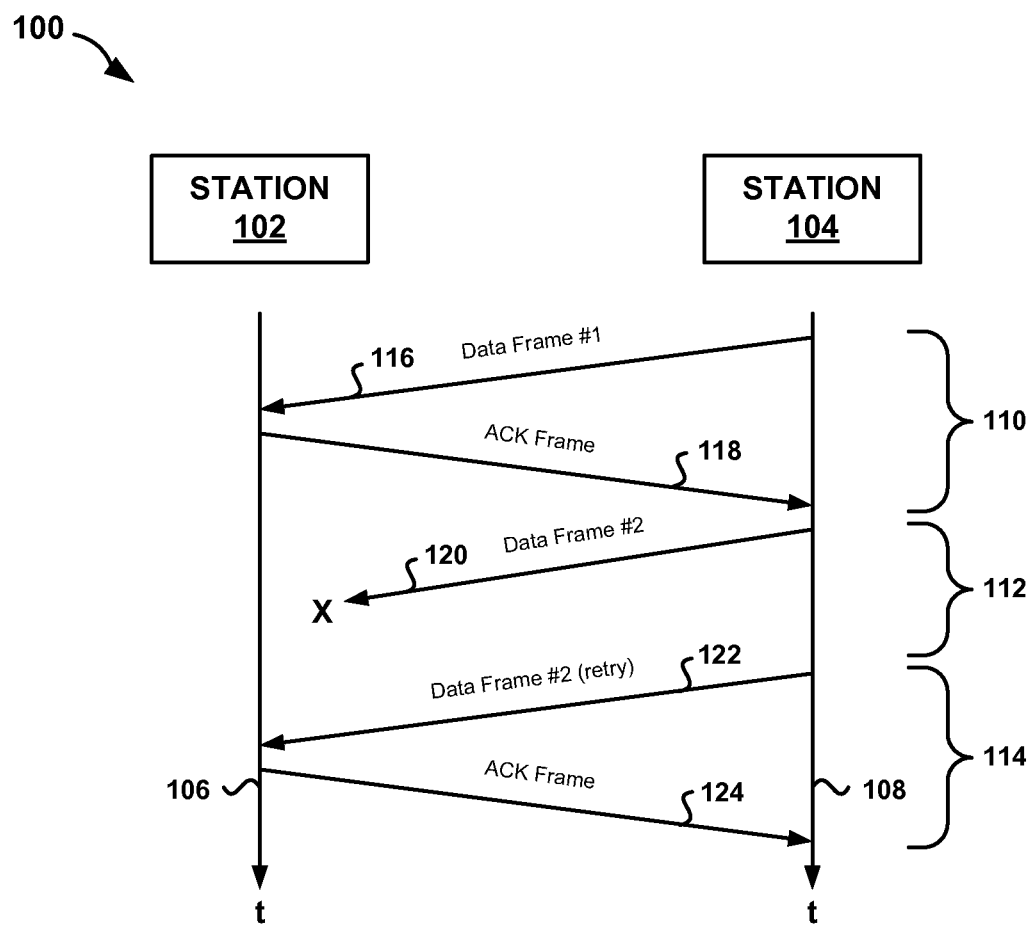
FIG. 6 is a timing diagram illustrating example frame exchange sequences between two wireless communication devices.

FIG. 6 is a timing diagram 100 illustrating example frame exchange sequences between two wireless communication devices. Timing diagram 100 includes stations 102, 104, axes 106, 108, frame exchange sequences 110, 112, 114, and frame exchange vectors 116, 118, 120, 122, 124.

Stations 102, 104 may correspond to any of access point 12, devices 16A-16D, and devices 32A-32C in FIGS. 1A-2B. In some examples, stations 102, 104 may be either access point stations or non-access point stations. For example, station 102 may be a laptop computing device acting as an 802.11 non-access point station and station 104 may be a computing device acting as an 802.11 access point station.

Stations 102, 104 may act either as a transmitter device or a receiver device for one or more particular frame exchange sequences. For example, as shown in the frame exchange sequences 110, 112, 114 of FIG. 6, station 104 is acting as a transmitter device because station 104 is sending data frames to other stations and receiving ACK frames. Similarly, station 102 is acting as a receiver device because station 102 is receiving data frames and sending ACK frames. Although FIG. 6 depicts only frame exchange sequences where station 104 is acting as a transmitter device and station 102 is acting as a receiver device, it should be noted that the stations 102, 104 may also perform frame exchange sequences where station 102 acts a transmitter device and station 104 acts as a receiver device.

Axes 106, 108 are time axes that increase in time from the top of timing diagram 100 to the bottom of timing diagram 100. In general, the same vertical location on each of axes 106, 108 corresponds to the same instance of time.

Timing diagram 100 illustrates three frame exchange sequences 110, 112, 114. Frame exchange sequence 110 includes a first frame exchange vector 116 representing a data frame (Data Frame #1) sent from station 104 to station 102, and a second frame exchange vector 118 representing an ACK frame sent from station 102 to station 104. The ACK frame represents that the data frame received by station 102 was received successfully and was not corrupted. Because station 104 receives the ACK frame, station 104 regards the frame exchange sequence 110 to be a successful frame exchange sequence.

Similar to frame exchange sequence 110, frame exchange sequence 114 includes a first frame exchange vector 122 representing a data frame (Data Frame #2 (retry)) sent from station 104 to station 102, and a second frame exchange vector 124 representing an ACK frame sent from station 102 to station 104. Because station 104 receives the ACK frame represented by vector 124, station 104 regards the frame exchange sequence 110 to be a successful frame exchange sequence.

Frame exchange sequence 112 includes frame exchange vector 120 representing a data frame (Data Frame #2) sent from station 104 to station 102. As depicted by the letter X in FIG. 6, the data frame represented by frame exchange vector 120 is not successfully received by station 102. The unsuccessful reception of the data frame, in some examples, may be due to the data frame never reaching station 102. In such examples, station 102 does not send an ACK frame to station 104 because station 102 never received the frame, and frame exchange sequence 112 is regarded by station 104 as being unsuccessful.

In other examples, the unsuccessful reception of the data frame may be due to the data frame becoming corrupted with one or more errors during transmission. In such examples, station 102 receives the frame but detects one or more errors in the received frame. Because the frame does not pass the error detection test, the frame is regarded as being unsuccessfully received by station 102. Therefore, in conventional stations, station 102 does not send an ACK frame to station 104, and frame exchange sequence 112 is regarded by station 104 as being unsuccessful.

A station designed in accordance with this disclosure, however, may cause station 104 to regard frame exchange sequence 112 as being successful even though the data frame represented by vector 120 was never successfully received at station 102. For example, station 102 may send an ACK frame in response to receiving a data frame that has become corrupted with one or more errors. In such examples, station 104 may use a rate adaptation algorithm that selects physical layer transmission rates based on whether an ACK was received for one or more previous frame exchange sequences. Because the rate adaptation algorithm uses ACK frames to determine physical layer transmission rates, station 102 may use ACK frames to remotely control the rate adaptation algorithm of station 104.

Figure 7:
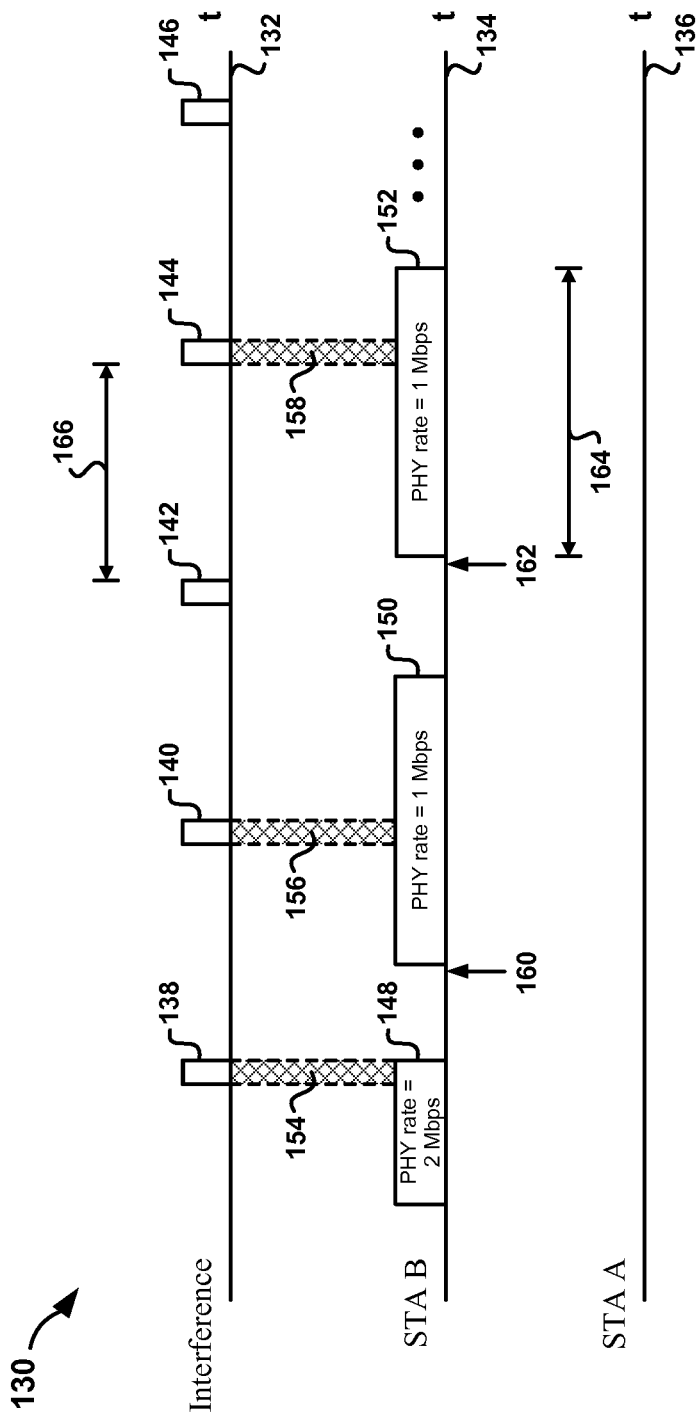
FIG. 7 is a timing diagram illustrating a catastrophic failure that may occur when using a transmitter-side rate adaptation algorithm in the presence of interference.

FIG. 7 is a timing diagram 130 illustrating a catastrophic failure that may occur when using a transmitter-side rate adaptation algorithm in the presence of interference. Timing diagram 130 includes axes 132, 134, 136, interference bursts 138, 140, 142, 144, 146, data frames 148, 150, 152, collision periods 154, 156, 158, time points 160, 162 and time periods 164, 166.

Axes 132, 134, 136 are time axes that increase in time from the left-side of timing diagram 130 to the right side of timing diagram 130. In general, the same horizontal location on each of axes 132, 134 and 136 corresponds to the same instance of time.

Axis 132 depicts interference bursts 138, 140, 142, 144, 146 which are generated by an interference source over a given time period. Axis 134 depicts data frames 148, 150, 152 which are transmitted by WLAN Station B (i.e., "STA B") over a given time period. Axis 136 depicts that no ACK frames are transmitted by WLAN Station A (i.e., "STA A") over a given time period.

In the example timing diagram 130 of FIG. 7, Station B is acting as a transmitter device and Station A is acting as a receiver device. Station B includes a transmitter-side rate adaptation algorithm, but Station A does not include a remote rate adaptation algorithm.

As shown in FIG. 7, the interference bursts 138, 140, 142, 144, 146 may be substantially periodic bursts of interference. In other words, the time period between each burst 138, 140, 142, 144, 146 of interference may be substantially constant. Interference bursts 138, 140, 142, 144, 146 may overlap the communications channel used by the wireless link established between WLAN Station A and WLAN Station B.

In some examples, such interference may be generated by, e.g., a DECT transmitter device and/or or a Bluetooth® device. In additional examples, such interference may be generated by a device that utilizes a TDM or a TDMA multiplexing scheme. In further examples, interference bursts 138, 140, 142, 144, 146 may be generated by an interference source that is co-located with WLAN Station A thereby causing packets received by WLAN Station A to be corrupted.

As shown in FIG. 7, Station B begins by transmitting data frame 148 at a PHY rate of 2 Mbps. After transmitting the frame, Station B waits for Station A to send an ACK frame in response to successfully receiving data frame 148. However, during transmission of data frame 148, interference burst 138 causes data frame 148 to become corrupt. More specifically, during collision period 154, interference burst 138 overlaps with a portion of data packet 148 indicating that interference burst 138 and data packet 148 have collided on the communications channel used by Station A and Station B thereby causing data frame 148 to become corrupt. Station A receives data frame 148, but determines that data frame 148 is corrupt. Therefore, Station A does not send an ACK frame in response to receiving data frame 148.

At time point 160, the ACK waiting period for Station B expires, and Station B determines that data frame 148 was not successfully received by Station A. A rate adaptation algorithm executing within Station B determines that the PHY rate should be lowered to 1 Mbps for subsequent frame exchange sequences. This determination may be based on the assumption that lowering the PHY rate will increase the signal strength of the transmitted data frame, which will in turn increase the likelihood of successful frame exchange sequences in the future.

Thus, data frame 150 is transmitted at a PHY rate of 1 Mbps. In some examples, data frame 150 may be a retransmission of data frame 148. During transmission of data frame 150, overlapping interference burst 140 collides with data frame 150 causing data frame 150 to become corrupt. Station A receives data frame 150, and determines that data frame 150 is corrupt. Therefore, Station A does not send an ACK frame in response to receiving data frame 150.

At time point 162, the ACK waiting period for Station B expires, and Station B determines that data frame 150 was not successfully received by Station A. A rate adaptation algorithm executing within Station B determines that the PHY rate should be maintained at 1 Mbps for subsequent frame exchange sequences. In this instance, Station B did not lower the PHY rate because 1 Mbps is the lowest PHY rate at which Station B, in this example, is capable of transmitting packets.

Data frame 152 is subsequently transmitted at a PHY rate of 1 Mbps. In some examples, data frame 152 may be a retransmission of data frame 150. During transmission of data frame 152, overlapping interference burst 144 collides with data frame 152 causing data frame 152 to become corrupt. Station A receives data frame 150, determines that data frame 150 is corrupt, and therefore does not send an ACK frame in response to receiving data frame 150. Station B never receives an ACK frame in response to data frame 150. Because Station B does not receive an ACK frame for data frame 150, the rate adaptation algorithm will determine either to maintain the 1 Mbps PHY rate or to further lower the PHY rate for subsequent frame exchange sequences.

As illustrated in FIG. 7, interference bursts 138, 140, 142, 144, 146 in conjunction with the rate adaptation algorithm operating in Station B cause a catastrophic failure of the wireless link between WLAN Station A and WLAN Station B. In particular, the rate adaptation algorithm operating in Station B requires at least one or more successful frame exchange sequences to occur prior to raising the PHY rate. However, if the data packet transmission time 164 is greater than the amount of time 166 between interference bursts 138, 140, 142, 144, 146, it will be essentially impossible to ever have a successful frame exchange sequence. Therefore, the rate adaptation algorithm will either determine to maintain the current PHY rate or to further lower the PHY rate, but will not raise the PHY rate. Thus, a catastrophic failure occurs.

FIG. 7 is illustrative of a case where a transmitter-side rate adaptation algorithm decreases the likelihood of a successful frame exchange sequence. More specifically, a catastrophic failure is depicted for a case where the data packet transmission time is greater than the amount of time between interference bursts. In other examples, however, a catastrophic failure may also include cases where the data packet transmission time is greater than a certain percentage of the amount of time between interference bursts. For example, if the data packet transmission time is greater than 90% of the amount of time between interference bursts, then a catastrophic failure may still occur because most of the time, data packets will not be able to be successfully transmitted.

Figure 8:
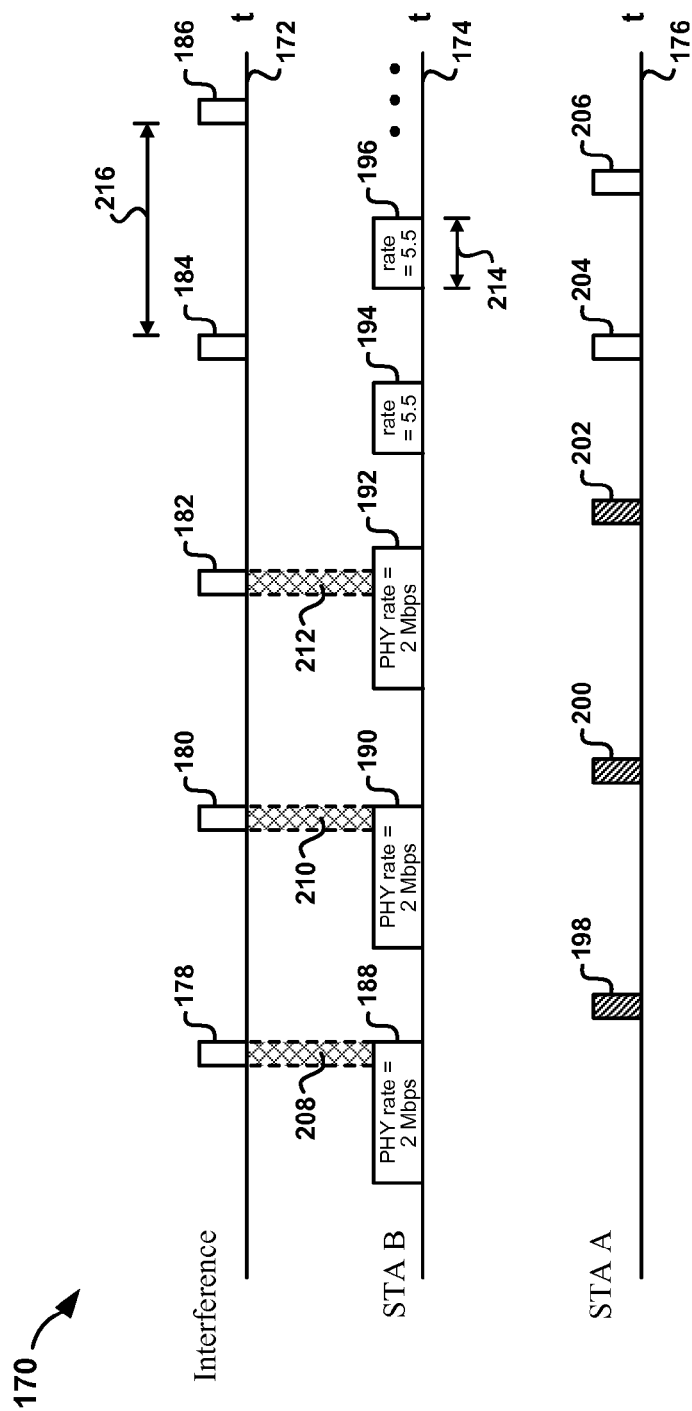
FIG. 8 is a timing diagram illustrating how a catastrophic failure may be prevented by using the remote rate control techniques according to this disclosure.

FIG. 8 is a timing diagram 170 illustrating how a catastrophic failure may be prevented by using remote rate control techniques according to this disclosure. Timing diagram 170 includes axes 172, 174, 176, interference bursts 178, 180, 182, 184, 186, data frames 188, 190, 192, 194, 196, forced ACK frames 198, 200, 202, standard ACK frames 204, 206, collision periods 208, 210, 212, and time periods 214, 216.

Similar to timing diagram 130 illustrated in FIG. 7, axes 172, 174, 176 are time axes that increase in time from the left-side of timing diagram 170 to the right side of timing diagram 170. In general, the same horizontal location on each of axes 172, 174 and 176 corresponds to the same instance of time.

Axis 172 depicts interference bursts 178, 180, 182, 184, 186 which are generated by an interference source over a given time period. Axis 174 depicts data frames 188, 190, 192, 194, 196 which are transmitted by WLAN Station B (i.e., "STA B") over a given time period. Axis 136 depicts forced ACK frames 198, 200, 202 and standard ACK frames 204, 206 transmitted by WLAN Station A (i.e., "STA A") over a given time period. As used herein, a "forced ACK" frame may refer to an ACK frame that is sent in response to a received data frame that is corrupt, and a "standard ACK frame" may refer to an ACK frame that is sent in response to a received data frame that is not corrupt.

In the example timing diagram 170 of FIG. 8, Station B is acting as a transmitter device and Station A is acting as a receiver device. Station B includes a transmitter-side rate adaptation algorithm, and Station A includes a remote rate adaptation algorithm according to the techniques of this disclosure.

Interference bursts 178, 180, 182, 184, 186 may be substantially periodic bursts of interference, and may overlap the communications channel used by the wireless link established between WLAN Station A and WLAN Station B. Interference bursts 178, 180, 182, 184, 186 may be generated by the same or similar devices as those which are described above with respect to FIG. 7.

As shown in FIG. 8, Station B begins by transmitting data frame 188 at a PHY rate of 2 Mbps. After transmitting the frame, Station B waits for Station A to send an ACK frame in response to successfully receiving data frame 188. However, during transmission of data frame 188, interference burst 178 causes data frame 188 to become corrupt. More specifically, during collision period 208, interference burst 178 overlaps with a portion of data packet 188 indicating that interference burst 178 and data packet 188 have collided on the communications channel used by Station A and Station B thereby causing data frame 188 to become corrupt. Station A receives data frame 188, but determines that data frame 188 is corrupt. The remote rate control algorithm operating within Station A determines to send a positive ACK frame in response to receiving corrupted data frame 188, and Station A sends forced ACK frame 198 to Station B.

After receiving forced ACK frame 198, Station B determines that data frame 188 was successfully received by Station A. A rate adaptation algorithm executing within Station B determines that the PHY rate should be not be lowered because the frame exchange sequence was successful. This determination may be based on the assumption that the PHY rate should only be decreased when there a certain number of unsuccessful frame exchange sequences have occurred. In this instance, the rate adaptation algorithm maintains rather than increases the PHY rate because the rate adaptation algorithm is waiting for a certain number or percentage of successful frame exchange sequences prior to increasing the PHY rate.

Thus, data frame 190 is transmitted at a PHY rate of 2 Mbps. Data frame 190 may be a data frame that contains data different from that which is contained in data frame 188. In other words, data frame 190 may be independent of data frame 188 as opposed to a retransmission of data frame 188. Thus, even though data frame 188 was never successfully received by Station A, the remote rate control algorithm operating in Station A has effectively off-loaded the handling of corrupted frame 188 to layers above the layer at which the remote rate control algorithm is operating, e.g., the transport layer, the application layer, etc.

During transmission of data frame 190, overlapping interference burst 180 collides with data frame 190 causing data frame 190 to become corrupt. Station A receives data frame 190, and determines that data frame 190 is corrupt. The remote rate control algorithm operating within Station A determines to send a positive ACK frame in response to receiving corrupted data frame 190, and Station A sends forced ACK frame 200 to Station B.

After receiving forced ACK frame 200, Station B determines that data frame 190 was successfully received by Station A. A rate adaptation algorithm executing within Station B determines that the PHY rate should be not be lowered because the frame exchange sequence was successful. In this instance, the rate adaptation algorithm maintains rather than increases the PHY rate because the rate adaptation algorithm is still waiting for a certain number or percentage of successful frame exchange sequences prior to increasing the PHY rate.

Thus, data frame 192 is transmitted at a PHY rate of 2 Mbps. Data frame 192 may be independent of data frame 190 as opposed to a retransmission of data frame 190. During transmission of data frame 192, overlapping interference burst 182 collides with data frame 192 causing data frame 192 to become corrupt. Station A receives data frame 192, and determines that data frame 192 is corrupt. The remote rate control algorithm operating within Station A determines to send a positive ACK frame in response to receiving corrupted data frame 192, and Station A sends forced ACK frame 202 to Station B.

After receiving forced ACK frame 202, Station B determines that data frame 192 was successfully received by Station A. A rate adaptation algorithm executing within Station B determines that the PHY rate should be not be lowered because the frame exchange sequence was successful. In this instance, the rate adaptation algorithm increases the PHY rate because a threshold number or percentage of successful frame exchange sequences has occurred at the previous PHY rate.

Thus, data frame 194 is transmitted at a PHY rate of 5.5 Mbps. Again, data frame 194 may be independent of data frame 192 as opposed to a retransmission of data frame 192. During transmission of data frame 194, no interference burst collides with data frame 194 causing data frame 194 to remain intact. Station A receives data frame 194, determines that data frame 194 is not corrupt, and sends standard positive ACK frame 204 in response to successfully receiving data frame 194.

After receiving standard ACK frame 204, Station B determines that data frame 194 was successfully received by Station A. A rate adaptation algorithm executing within Station B determines that the PHY rate should be not be lowered because the frame exchange sequence was successful. In this instance, the rate adaptation algorithm maintains rather than increases the PHY rate because the rate adaptation algorithm is waiting for a certain number or percentage of successful frame exchange sequences prior to increasing the PHY rate.

Thus, data frame 196 is transmitted at a PHY rate of 5.5 Mbps. During transmission of data frame 196, no interference burst collides with data frame 196 causing data frame 196 to remain intact. Station A receives data frame 196, determines that data frame 196 is not corrupt, and sends standard positive ACK frame 206 in response to successfully receiving data frame 196.

As can be seen by comparing FIGS. 7 and 8, the remote rate control algorithm operating in Station A has effectively prevented the catastrophic failure which occurred with respect to FIG. 7 from occurring in FIG. 8. In particular, forced ACK frames 198, 200, 202 prevented the transmitter-side rate adaptation algorithm from lowering the PHY rate as occurred in FIG. 7. In this manner, the remote rate control techniques of this disclosure may be used to prevent catastrophic failures from occurring due to channel interference.

Moreover, the forced ACK frames 198, 200, 202 eventually caused the transmitter-side rate adaptation algorithm to increase the PHY rate. Raising the PHY rate allowed the resulting data packet transmission time 214 to become substantially less than the amount of time between interference bursts 216 thereby increasing the likelihood of successful frame exchange sequences. In this manner, the remote rate control techniques of this disclosure may be used to increase the probability of successful frame exchange sequences.

In addition, the forced ACK frames 198, 200, 202 provided an increase in system throughput. In particular, as already discussed above, forced ACK frames 198, 200, 202 decrease the data frame transmission time thereby causing system throughput to increase. Moreover, as already discussed above, forced ACK frames 198, 200, 202 may increase the likelihood of successful frame exchange sequences in the future, which may decrease the number of retries that occur. Decreasing the number of retry frames that are transmitted may also cause the system throughput to increase. In addition, because the number of retry frames is reduced, the amount of time needed to perform a transmitter-side backoff algorithm may also be reduced. In this manner, the remote rate control techniques may provide, in some examples, a three-fold increase in system throughput (i.e., an increase in up to three different aspects) compared to that which is obtainable in conventional systems.

The techniques illustrated in FIGS. 9-19 are described with respect to various modules within controller 62 in FIG. 4 for exemplary purposes. It should be noted, however, that where specific modules are described as performing certain actions, in other examples, such actions may be performed by different modules or be performed generally by a processor or controller, e.g., controller 62. It should also be noted that the techniques illustrated in FIG. 9-19 are not limited to implementation within a single controller, but may be implemented as part of multiple controllers or processors as well as in multiple devices.

Figure 9:
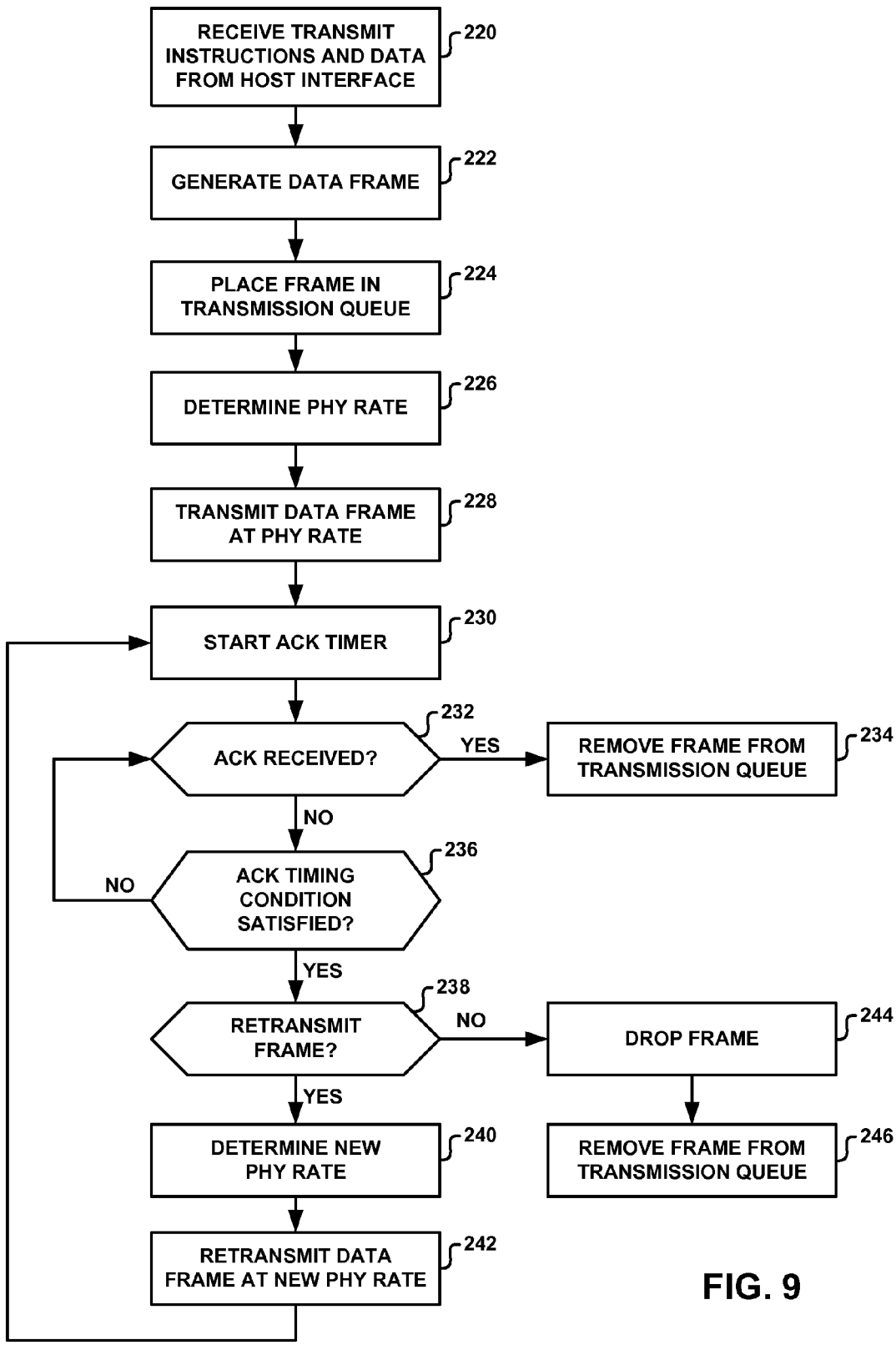
FIG. 9 is a flow diagram illustrating an example technique for transmitting frames according to this disclosure.

FIG. 9 is a flow diagram illustrating an example technique for transmitting frames according to this disclosure. Transmission sequence manager 68 receives transmit instructions from a host layer via host layer interface 86 (220). Frame generator 72 generates a data frame (222). Transmission sequence manager 68 places the data frame into a transmission queue (224). Rate selection module 76 determines a PHY rate at which to transmit the data frame (226). Transmission sequence manager 68 transmits the data frame at the determined PHY rate (228). Transmission sequence manager 68 starts an ACK timer (230).

Transmission sequence manager 68 determines if an ACK frame has been received for the transmitted data frame (232). If an ACK frame has been received for the transmitted data frame, transmission sequence manager 68 removes the frame from the transmission queue (234). If an ACK frame has not been received for the transmitted data frame, transmission sequence manager 68 determines if the ACK timing condition has been satisfied (236).

If the ACK timing condition has not been satisfied, transmission sequence manager 68 returns to decision block 232 to determine if an ACK frame has been received for the transmitted data frame. If the ACK timing condition has been satisfied, transmission sequence manager 68 determines whether to retransmit the data frame (238).

If transmission sequence manager 68 determines to retransmit the data frame, rate selection module 76 determines a new PHY rate at which to retransmit the data frame (240). Transmission sequence manager 68 retransmits the data frame at the new PHY rate (242). Otherwise, if transmission sequence manager 68 determines not to retransmit the data frame, transmission sequence manager 68 drops the frame (244), and removes the frame from the transmission queue (246).

Figure 10:
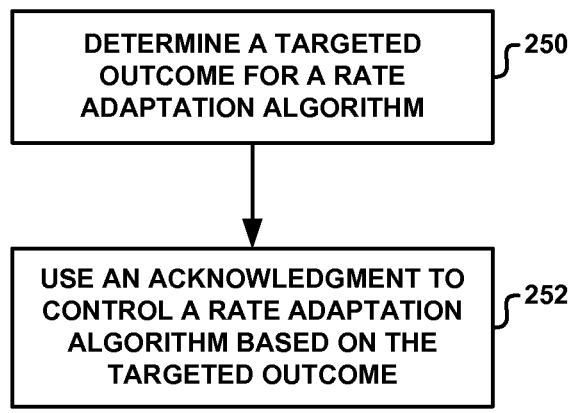
FIG. 10 is a flow diagram illustrating an example technique for remotely controlling a rate adaptation algorithm according to this disclosure.

FIG. 10 is a flow diagram illustrating an example technique for remotely controlling a rate adaptation algorithm according to this disclosure. Remote rate control module 78 determines a targeted outcome for a rate adaptation algorithm performed by a transmitter (250). Transmission sequence manager 68 uses positive acknowledgements to remotely control the rate adaptation algorithm performed by the transmitter based on at least the targeted outcome (252).

Figure 11:
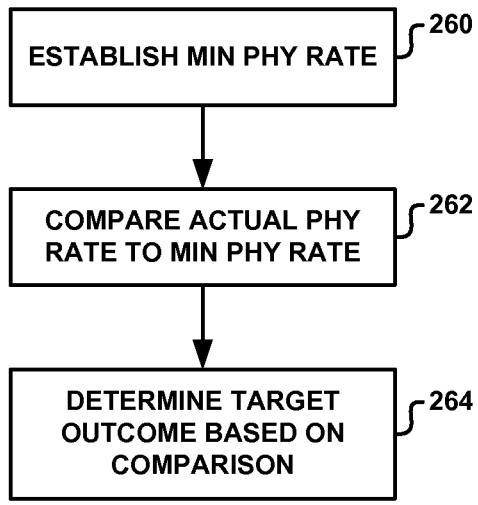
FIG. 11 is a flow diagram illustrating an example technique for determining a target outcome for a transmitter-side rate adaptation algorithm according to this disclosure.

FIG. 11 is a flow diagram illustrating an example technique for determining a target outcome according to this disclosure. The technique illustrated in FIG. 11 may correspond, in some examples, to process box 250 in FIG. 10.

As shown in FIG. 11, remote rate control module 78 establishes a minimum PHY rate (260). Remote rate control module 78 compares the actual PHY rate to the minimum PHY rate (262). Remote rate control module 78 determines the target outcome based on the comparison (264).

Figure 12:
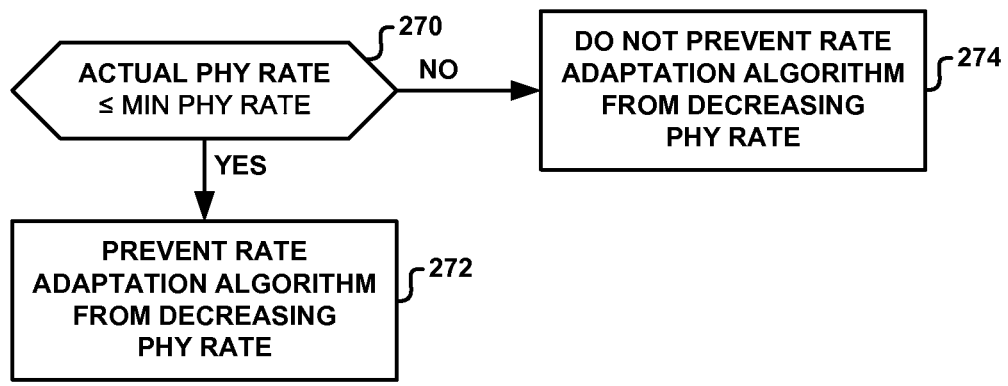
FIG. 12 is a flow diagram illustrating another example technique for determining a target outcome for a transmitter-side rate adaptation algorithm according to this disclosure.

FIG. 12 is a flow diagram illustrating another example technique for determining a target outcome according to this disclosure. The technique illustrated in FIG. 12 may correspond, in some examples, to process boxes 262 and 264 in FIG. 11.

As shown in FIG. 12, remote rate control module 78 determines if the actual PHY rate is less than or equal to the minimum PHY rate (270). If the actual PHY rate is less than or equal to the minimum PHY rate, remote rate control module 78 determines that the targeted outcome is to prevent rate adaptation algorithm from further decreasing the PHY rate (272). If the actual PHY rate is not less than or equal to the minimum PHY rate, remote rate control module 78 determines that the targeted outcome is to not prevent rate adaptation algorithm from further decreasing the PHY rate (274).

Figure 13:
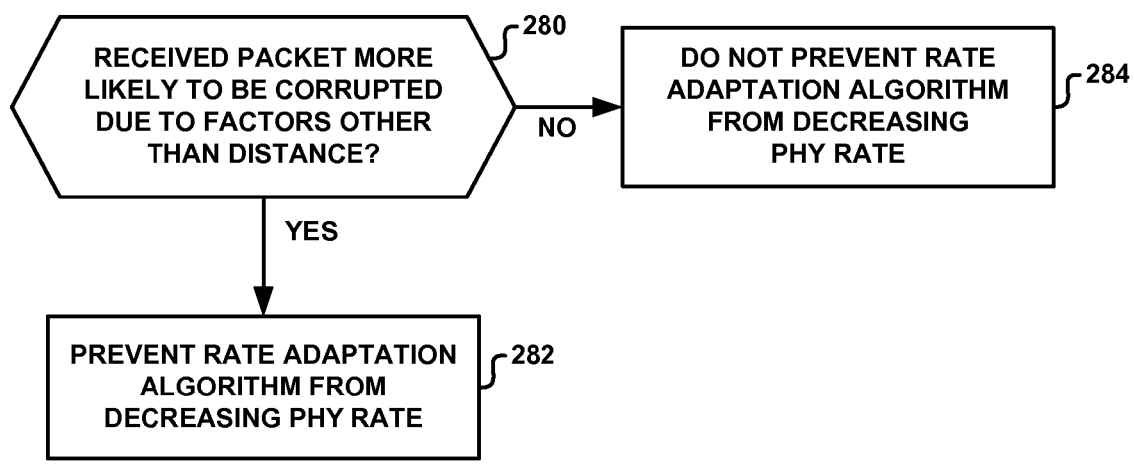
FIG. 13 is a flow diagram illustrating another example technique for determining a target outcome for a transmitter-side rate adaptation algorithm according to this disclosure.

FIG. 13 is a flow diagram illustrating another example technique for determining a target outcome according to this disclosure. The technique illustrated in FIG. 13 may correspond, in some examples, to process box 250 in FIG. 10.

As shown in FIG. 13, remote rate control module 78 determines whether the received packet is more likely to be corrupted due to factors other than distance rather than due to distance (280). The distance may be the distance between the transmitting device and receiving device. If the received packet is more likely to be corrupted due to factors other than distance, remote rate control module 78 determines that the targeted outcome is to prevent rate adaptation algorithm from further decreasing the PHY rate (282). If the received packet is not more likely to be corrupted due to factors other than distance, remote rate control module 78 determines that the targeted outcome is to not prevent rate adaptation algorithm from further decreasing the PHY rate (284).

Figure 14:
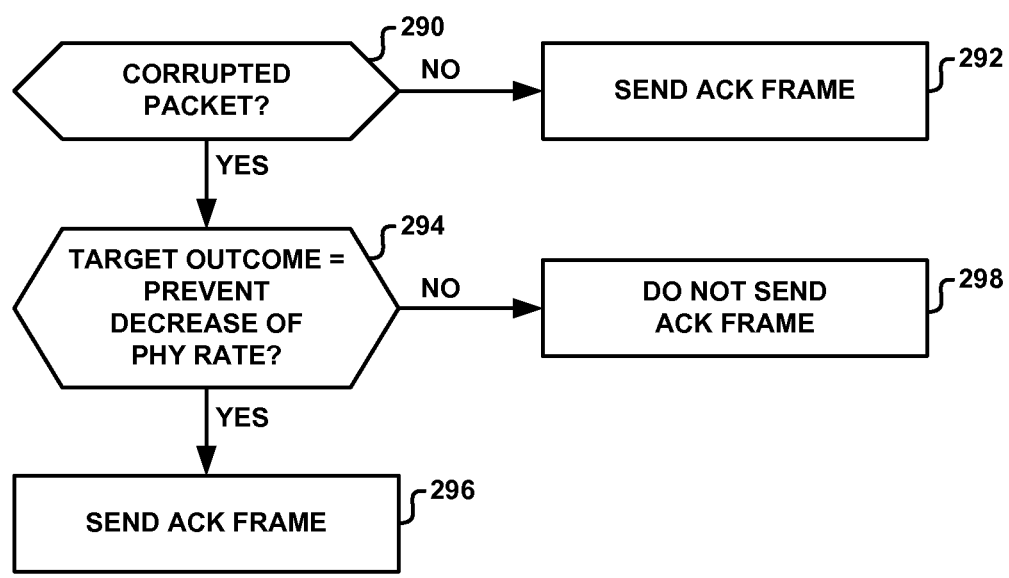
FIG. 14 is a flow diagram illustrating an example technique for using an acknowledgement to control a rate adaptation algorithm according to this disclosure.

FIG. 14 is a flow diagram illustrating an example technique for using an acknowledgement to control a rate adaptation algorithm according to this disclosure. The technique illustrated in FIG. 14 may correspond, in some examples, to process box 252 in FIG. 10.

As shown in FIG. 14, transmission sequence manager 68 determines whether the received packet is corrupted (290). In some examples, a corrupted packet may be a packet that fails an error detection test, and a non-corrupted packet may be a packet that passes an error detection test. In additional examples, a corrupted packet may be a packet that includes at least one error, and a non-corrupted packet may be a packet that does not include any errors. If the received packet is determined to not be corrupted, transmission sequence manager 68 sends a positive ACK frame to the transmitter device (292). If the received packet is determined to be corrupted, transmission sequence manager 68 determines if the target outcome is to prevent the rate adaptation algorithm from further decreasing the PHY rate (294).

If the target outcome is to prevent the rate adaptation algorithm from further decreasing the PHY rate, transmission sequence manager 68 sends a positive ACK frame to the transmitter device (296). If the target outcome is not to prevent the rate adaptation algorithm from further decreasing the PHY rate, transmission sequence manager 68 does not send a positive ACK frame to the transmitter device (298).

Figure 15:
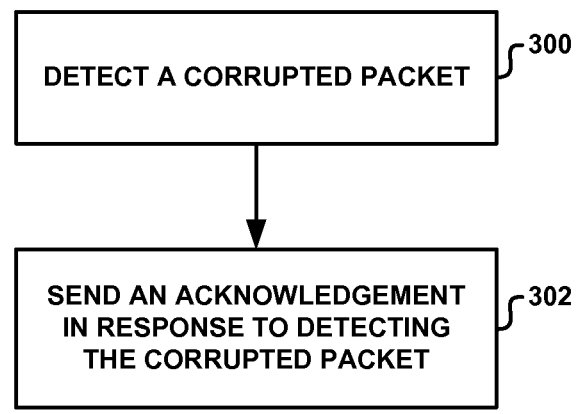
FIG. 15 is a flow diagram illustrating an example technique for sending an acknowledgement in response to receiving a corrupted packet according to this disclosure.

FIG. 15 is a flow diagram illustrating an example technique for sending acknowledgements in response to receiving a corrupted packet according to this disclosure. Error detection module 70 detects that a packet received at the receiver device is corrupted (300). In some examples, a corrupted packet may be a packet that fails an error detection test, and a non-corrupted packet may be a packet that passes an error detection test. In additional examples, a corrupted packet may be a packet that includes at least one error, and a non-corrupted packet may be a packet that does not include any errors. Transmission sequence manager 68 sends a positive ACK frame for the packet to the transmitter in response to detecting that the packet is corrupted (302).

Figure 16:
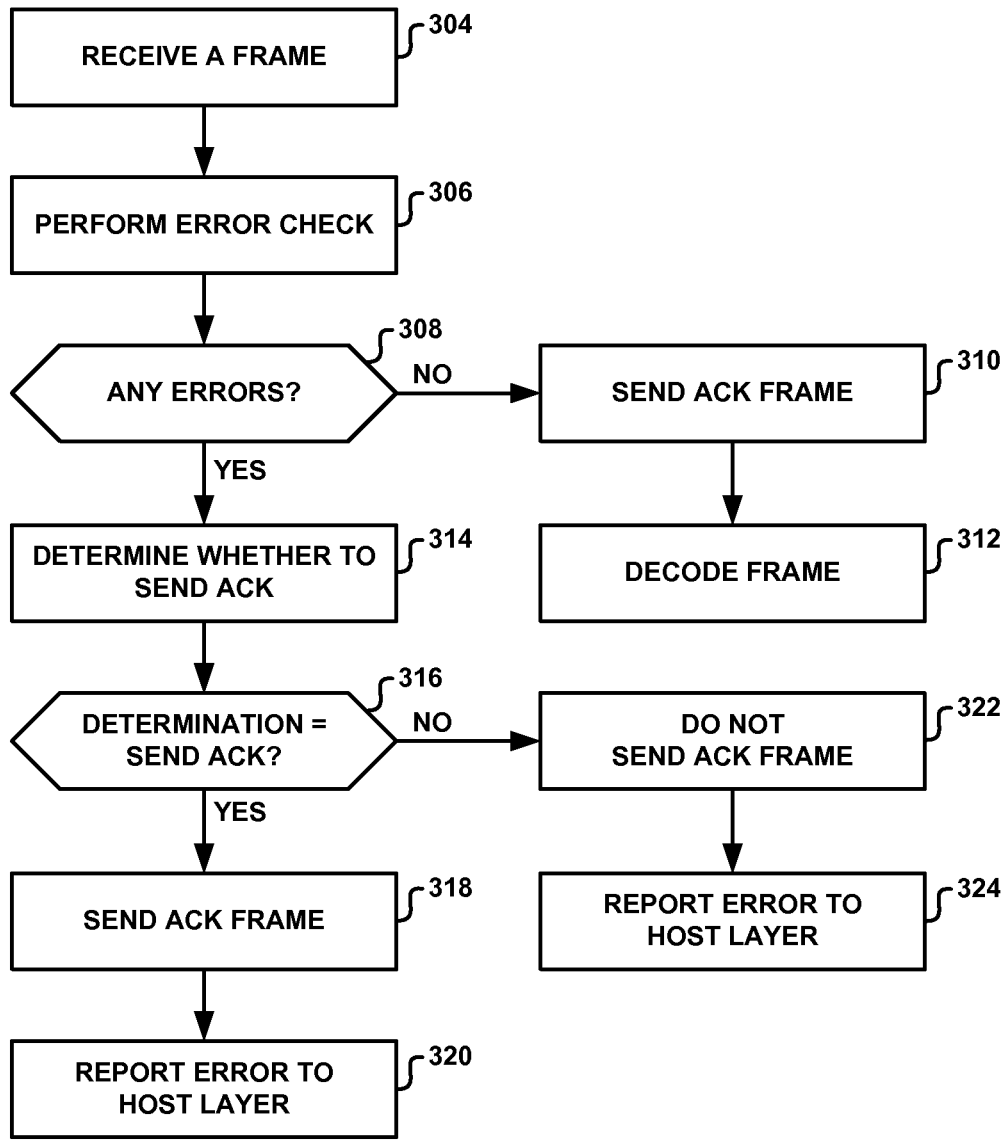
FIG. 16 is a flow diagram illustrating an example technique for operation of a receiver according to this disclosure.

FIG. 16 is a flow diagram illustrating an example technique of operation for a receiver according to this disclosure. In some examples, process box 306 may correspond to process box 300 in FIG. 15, and process boxes 314, 316 and 318 may correspond to process box 302 in FIG. 15.

As shown in FIG. 16, transmission sequence manager 68 receives a data frame (304). Error correction module 70 performs an error check on the data frame (306), and determines if there are any errors (308). If there are no uncorrectable errors, transmission sequence manager 68 sends a positive ACK frame to the transmitter device (310). Frame decoder 74 decodes the frame (312).

If there are one or more errors that are not correctable, remote rate control module 78 determines whether to send a positive ACK frame in response to the received frame (314). Transmission sequence manager 68 detects whether remote rate control module 78 determines to send an ACK frame (316). If remote rate control module 78 determines to send an ACK frame, transmission sequence manager 68 sends an ACK frame in response to receiving the data frame (318). Transmission sequence manager 68 reports the error to the host layer (320). If remote rate control module 78 determines to not send an ACK frame, transmission sequence manager 68 does not send an ACK frame in response to receiving the data frame (322). Transmission sequence manager 68 reports the error to the host layer (324).

Figure 17:
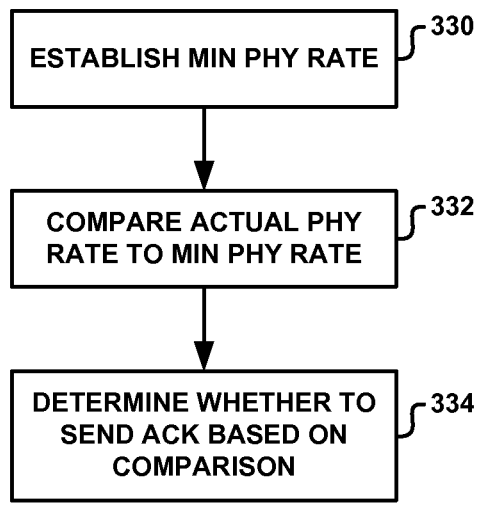
FIG. 17 is a flow diagram illustrating an example technique for determining whether to send an acknowledgement according to this disclosure.

FIG. 17 is a flow diagram illustrating an example technique for determining whether to send an acknowledgement according to this disclosure. The technique illustrated in FIG. 17 may correspond, in some examples, to process box 314 in FIG. 16.

As shown in FIG. 17, remote rate control module 78 establishes a minimum PHY rate (330). Remote rate control module 78 compares the actual PHY rate to the minimum PHY rate (332). Remote rate control module 78 determines whether to send a positive ACK frame based on the comparison (334).

Figure 18:
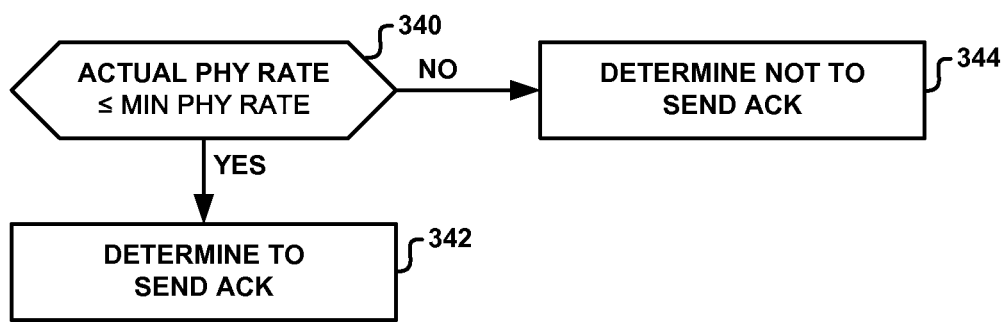
FIG. 18 is a flow diagram illustrating another example technique for determining whether to send an acknowledgement according to this disclosure.

FIG. 18 is a flow diagram illustrating another example technique for determining whether to send an acknowledgement according to this disclosure. The technique illustrated in FIG. 18 may correspond, in some examples, to process boxes 322 and 324 in FIG. 17.

As shown in FIG. 18, remote rate control module 78 determines if the actual PHY rate is less than or equal to the minimum PHY rate (340). If the actual PHY rate is less than or equal to the minimum PHY rate, remote rate control module 78 determines to send a positive ACK frame to the transmitter device (342). If the actual PHY rate is not less than or equal to the minimum PHY rate, remote rate control module 78 determines to not send a positive ACK frame to the transmitter device (344).

Figure 19:
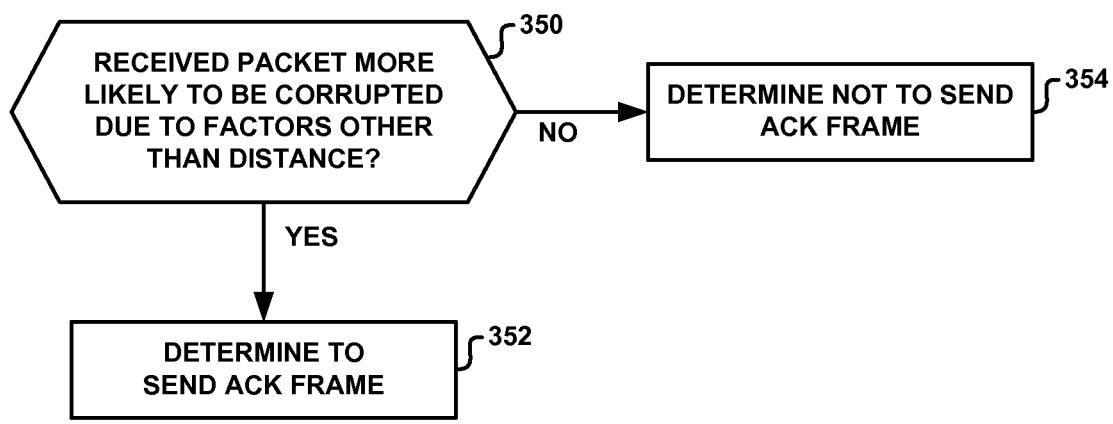
FIG. 19 is a flow diagram illustrating another example technique for determining whether to send an acknowledgement according to this disclosure.

FIG. 19 is a flow diagram illustrating another example technique for determining whether to send an acknowledgement according to this disclosure. The technique illustrated in FIG. 19 may correspond, in some examples, to process box 314 in FIG. 16.

As shown in FIG. 19, remote rate control module 78 determines whether the received packet is more likely to be corrupted due to factors other than distance rather than due to distance (350). The distance may be the distance between the transmitting device and receiving device. If the received packet is more likely to be corrupted due to factors other than distance, remote rate control module 78 determines to send a positive ACK frame (352). If the received packet is not more likely to be corrupted due to factors other than distance, remote rate control module 78 determines to not send a positive ACK frame (354).

Figure 20:
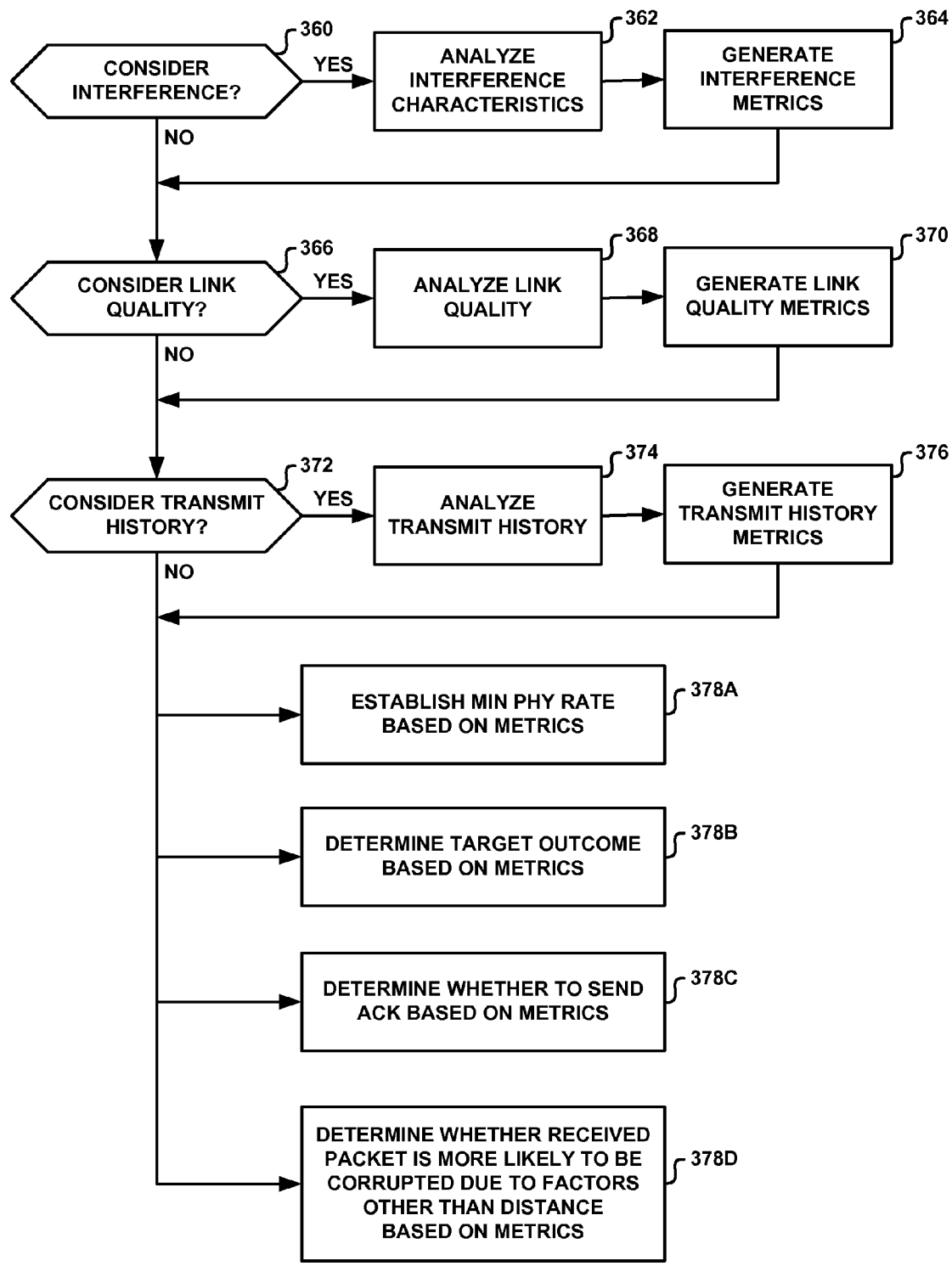
FIG. 20 is a flow diagram illustrating multiple techniques for remotely controlling a rate adaptation algorithm according to this disclosure.

FIG. 20 is a flow diagram illustrating multiple techniques for remotely controlling a rate adaptation algorithm according to this disclosure. In general, one of process boxes 378A-378D may be selected to form a complete technique in FIG. 20. Thus, FIG. 20 represents at least four techniques, one technique for each of process boxes 378A-378D.

The technique corresponding to process box 378A may correspond, in some examples, to process box 260 of FIG. 11 and/or process box 330 of FIG. 17. The technique corresponding to process box 378B may correspond, in some examples, to process box 250 of FIG. 10. The technique corresponding to process box 378C may correspond, in some examples, to process box 302 of FIG. 15 and/or process box 314 of FIG. 16. The technique corresponding to process box 378D may correspond, in some examples, to the determination made in decision box 280 of FIG. 13 and/or to the determination made in decision box 350 of FIG. 19

Remote rate control module 78 determines if interference should be considered (360). If interference should not be considered, remote rate control module 78 proceeds to decision block 366 without analyzing the interference. If interference should be considered, interference analyzer 92 analyzes interference characteristics (362), and generates one or more interference metrics based on the analysis (364). Example interference metrics may include, for example, the period at which interference bursts occur, the amount of free-time between interference bursts, the frequency at which interference bursts occur, the intensity of the interference, etc. In some examples, interference analyzer 92 may analyze multiples sources of interference with different periods and/or intensities to produce one or more interference metrics. Remote rate control module 78 proceeds to decision block 366.

Remote rate control module 78 determines if link quality should be considered (366). If interference should not be considered, remote rate control module 78 proceeds to decision block 372 without analyzing the link quality. If link quality should be considered, link quality analyzer 94 analyzes the link quality (368), and generates one or more link quality metrics based on the analysis (370). Link quality metrics may include, for example, one or more of the following metrics: an RSSI, the power level of a recently received signal, an SNR of a recently received signal, and the like. Remote rate control module 78 proceeds to decision block 372.

Remote rate control module 78 determines if transmission history should be considered (372). If interference should not be considered, remote rate control module 78 proceeds to one of process blocks 378A-378D without analyzing the transmission history. If transmission history should be considered, transmission history analyzer 96 analyzes the transmission history (374), and generates one or more transmission history metrics based on the analysis (376). Transmission history metrics may include, for example, the number of retries that have occurred for a particular frame exchange sequence or set of frame exchange sequences, the PHY rate used by the transmitter device, correlations between the PHY rate used for a frame exchange sequence and the success of the frame exchange sequence, and/or the burstiness or periodicity of the transmissions. Remote rate control module 78 proceeds to one of process blocks 378A-378D.

In some examples, decision module 98 establishes a minimum PHY rate based on one or more of the interference metrics, link quality metrics, and transmission history metrics (378A). In additional examples, decision module 98 determines a target outcome for a transmitter-side rate adaptation algorithm based on one or more of the interference metrics, link quality metrics, and transmission history metrics (378B).

In further examples, decision module 98 determines whether to send a positive ACK frame for a corrupted frame based on one or more of the interference metrics, link quality metrics, and transmission history metrics (378C). In additional examples, decision module 98 determines whether the received packet is more likely to be corrupted due to factors other than distance rather than due to distance based on one or more of the interference metrics, link quality metrics, and transmission history metrics (378D).

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In each case, such a component may include at least some hardware for execution of the software and/or firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

The implementations described above and other implementations are within the scope of the following claims.

What is claimed is:

1. A method comprising:
  detecting, with a receiver device, that a packet received from a transmitter is corrupted;
  determining whether to send a positive acknowledgement for the packet to the transmitter;
    wherein the determining whether to send the positive acknowledgement comprises determining to send the positive acknowledgement
    if (a) detecting that the packet is corrupted,
    if (b) a reduction in a transmission rate by the transmitter will decrease a likelihood of a successful frame transmission sequence; and
    if (c) determining to prevent a rate adaptation algorithm of the transmitter from further decreasing the transmission rate; and
  sending, with the receiver device, the positive acknowledgement for the packet to the transmitter if determining to send the positive acknowledgement; wherein a lack of reception of the positive acknowledgement by the transmitter is expected to cause the rate adaptation algorithm of the transmitter to decrease the transmission rate;
  wherein the determining of whether to send the positive acknowledgement is based on at least one or more characteristics of channel interference and comprises determining an estimated time period between bursts of the channel interference; and
  wherein the determining whether to send the positive acknowledgement is based on at least the estimated time period between bursts of the channel interference and comprises:
    determining a packet transmission time period that would result from the reduction in the transmission rate by the transmitter;
    comparing the packet transmission time period to a percentage of the time period between bursts of the channel interference; and
    determining to send the positive acknowledgement if the reduction in the transmissions rate is expected to cause a packet length of subsequent transmissions to increase beyond a length of an available free-time between bursts of the channel interference.

2. The method of claim 1, wherein the channel interference is based on interference generated by at least one of a mobile phone device, a hands-free device, a cordless telephone device, a device that communicates according to a Bluetooth® communications protocol, a Digital Enhanced Cordless Telecommunications (DECT) device, an Enhanced Digital Cordless Telecommunications (EDCT) device, and a World Digital Cordless Telecommunications (WDCT) device, and a device that communicates according to a cordless protocol.

3. The method of claim 1, wherein the channel interference occupies at least part of a 2.4 gigahertz (GHz) Industrial, Scientific and Medical (ISM) frequency band.

4. The method of claim 1, wherein the channel interference is generated by a device that communicates according to a time division multiplexing (TDM) protocol.

5. The method of claim 1, wherein determining whether to send the positive acknowledgement comprises determining whether to send the positive acknowledgement based on at least a link quality metric.

6. The method of claim 5, wherein determining whether to send the positive acknowledgement based on at least the link quality metric comprises: determining, based on the link quality metric, a level of link quality; and sending the positive acknowledgement if the level of link quality is higher than a threshold level of link quality.

7. The method of claim 5, wherein the link quality metric comprises at least one of a power level metric indicative of the power level of a received signal from the transmitter and a Received Signal Strength Indicator (RSSI).

8. The method of claim 5, wherein the link quality metric is derived from at least one of a retry bit contained within control data of the packet, a number of retries that have been performed by the transmitter during a time window, and a history of physical layer transmission rates for the transmitter during a time window.

9. The method of claim 1, wherein determining whether to send the positive acknowledgement comprises determining whether to send the positive acknowledgement based on at least a threshold transmission rate, wherein the threshold transmission rate is based on at least one of interference characteristics, link quality information, and transmit history information.

10. The method of claim 1, wherein the positive acknowledgement indicates to the transmitter that the packet was successfully received and not corrupted.

11. The method of claim 1, wherein the packet was transmitted by the transmitter to the receiver device according to an Institute of Electrical and Electronics Engineers (IEEE) 802.11 standard communications protocol.

12. The method of claim 1, further comprising: determining not to send the positive acknowledgement for the packet to the transmitter if (a) detecting that the packet is corrupted, if (b) the reduction in the transmission rate by the transmitter will decrease the likelihood of the successful frame transmission sequence; and if (c) determining not to prevent the rate adaptation algorithm of the transmitter from further decreasing the transmission rate.

13. A receiver device comprising:
a controller configured to:
detect that a packet received at the receiver device from a transmitter is corrupted;
perform a determination of whether to send a positive acknowledgement for the packet to the transmitter, wherein the determination of whether to send the positive acknowledgement comprises determining to send the positive acknowledgement if (a) detecting that the packet is corrupted, if (b) a reduction in a transmission rate by the transmitter will decrease a likelihood of a successful frame transmission sequence; and if (c) determining to prevent a rate adaptation algorithm of the transmitter from further decreasing the transmission rate; and
send the positive acknowledgement for the packet to the transmitter if determining to send the positive acknowledgement;
wherein the determination of whether to send the positive acknowledgement is based on at least one or more characteristics of channel interference and comprises determining an estimated time period between bursts of the channel interference; and
wherein the determination of whether to send the positive acknowledgement is based on at least the estimated time period between bursts of the channel interference and comprises:
determining a packet transmission time period that would result from the reduction in the transmission rate by the transmitter;
comparing the packet transmission time period to a percentage of the time period between bursts of the channel interference; and
determining to send the positive acknowledgement if the reduction in the transmissions rate is expected to cause a packet length of subsequent transmissions to increase beyond a length of an available free-time between bursts of the channel interference;
wherein a lack of reception of the positive acknowledgement by the transmitter is expected to cause the rate adaptation algorithm of the transmitter to decrease the transmission rate.

14. The device of claim 13, wherein the channel interference is based on interference generated by at least one of a mobile phone device, a hands-free device, a cordless telephone device, a device that communicates according to a Bluetooth® communications protocol, a Digital Enhanced Cordless Telecommunications (DECT) device, an Enhanced Digital Cordless Telecommunications (EDCT) device, a World Digital Cordless Telecommunications (WDCT) device, and a device that communicates according to a cordless protocol.

15. The device of claim 13, wherein the channel interference occupies at least part of a 2.4 gigahertz (GHz) Industrial, Scientific and Medical (ISM) frequency band.

16. The device of claim 13, wherein the channel interference is generated by a device that communicates according to a time division multiplexing (TDM) protocol.

17. The device of claim 13, wherein the controller is further configured to determine whether to send the positive acknowledgement based on at least a link quality metric.

18. The device of claim 17, wherein the controller is further configured to determine, based on the link quality metric, a level of link quality, and send the positive acknowledgement if the level of link quality is higher than a threshold level of link quality.

19. The device of claim 17, wherein the link quality metric comprises at least one of a power level metric indicative of the power level of a received signal from the transmitter and a Received Signal Strength Indicator (RSSI).

20. The device of claim 17, wherein the link quality metric is derived from at least one of a retry bit contained within control data of the packet, a number of retries that have been performed by the transmitter during a time window, and a metric derived from a history of transmission rates for the transmitter during a time window.

21. The device of claim 13, wherein the controller is further configured to determine whether to send the positive acknowledgement based on at least a threshold transmission rate, wherein the threshold transmission rate is based on at least one of interference characteristics, link quality information, and transmit history information.

22. The device of claim 13, wherein the positive acknowledgement indicates to the transmitter that the packet was successfully received and not corrupted.

23. The device of claim 13, wherein the packet was transmitted by the transmitter to the receiver device according to an Institute of Electrical and Electronics Engineers (IEEE) 802.11 standard communications protocol.

24. The device of claim 13 wherein the controller is arranged to determine not to send the positive acknowledgement for the packet to the transmitter if (a) detecting that the packet is corrupted, if (b) the reduction in the transmission rate by the transmitter will decrease the likelihood of the successful frame transmission sequence; and if (c) determining not to prevent the rate adaptation algorithm of the transmitter from further decreasing the transmission rate.

* * * * *